United States Patent
Anerousis et al.

(10) Patent No.: US 6,760,775 B1
(45) Date of Patent: Jul. 6, 2004

(54) SYSTEM, METHOD AND APPARATUS FOR NETWORK SERVICE LOAD AND RELIABILITY MANAGEMENT

(75) Inventors: Nikolaos Anerousis, New York, NY (US); Gisli Hjalmtysson, Gillette, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/519,468

(22) Filed: Mar. 6, 2000

Related U.S. Application Data

(60) Provisional application No. 60/122,995, filed on Mar. 5, 1999.

(51) Int. Cl.[7] ............................................. G06F 15/173
(52) U.S. Cl. ..................................... 709/238; 709/229
(58) Field of Search ............................... 709/229, 235, 709/236, 238, 240, 243, 105; 370/389

(56) References Cited

U.S. PATENT DOCUMENTS

| | | | |
|---|---|---|---|
| 5,557,745 A | | 9/1996 | Perlman et al. |
| 6,006,264 A | * | 12/1999 | Colby et al. ................. 709/240 |
| 6,185,619 B1 | * | 2/2001 | Joffe et al. .................. 709/229 |
| 6,286,052 B1 | * | 9/2001 | McCloghrie et al. ....... 370/235 |
| 6,308,216 B1 | * | 10/2001 | Goldszmidt et al. ........ 709/236 |
| 6,370,584 B1 | * | 4/2002 | Bestavros et al. .......... 709/238 |
| 6,519,254 B1 | * | 2/2003 | Chuah et al. ............... 370/389 |

FOREIGN PATENT DOCUMENTS

| | | |
|---|---|---|
| EP | 0 838 930 A2 | 4/1998 |
| WO | WO 99/06913 | 2/1999 |

OTHER PUBLICATIONS

Callon et al., "A Framework for Multiprotocol Label Switching," Internet Draft, pp. 1–69, Sep. 1999.
G. Lauer, "Address Servers in Hierarchical Networks," *IEEE* XP–002144129, 9 pages (1988).

* cited by examiner

*Primary Examiner*—Zarni Maung

(57) ABSTRACT

A method and system that enables a network and components of the network to be aware of the services existing at the edges of the network and to route connection requests for these services to appropriate servers within the network based on a variety of criteria. By making the network and network components service-aware, routing functions can be implemented in a more scalable and efficient way.

8 Claims, 11 Drawing Sheets

SYSTEM, METHOD AND APPARATUS FOR NETWORK SERVICE LOAD AND RELIABILITY MANAGEMENT

This non-provisional application claims the benefit of U.S. Provisional Application No. 60/122,995, filed Mar. 5, 1999, hereby incorporated by reference in its entirety.

BACKGROUND OF THE INVENTION

1. Field of Invention

The present invention relates to service load and reliability management in a network.

2. Description of Related Art

As the Internet becomes a more integral part of business operation, and increasingly the platform of choice for new network services, there is a growing need for higher and more consistent network service quality. This includes improved quality in network transport, but equally importantly requires high availability of servers and consistency in perceived server performance. To share the resource cost of managing quality, reliability and network service robustness, corporations are increasingly farming out the hosting of information and network services to network providers. To economically provide such business grade network service hosting services, network providers must employ multiple Network Service Hosting Sites (NSHSs). These NSHSs have independent failure and congestion characteristics for each network service, e.g., client. Additionally, the NSHSs each achieves high resource sharing among multiple network services, e.g., clients. The network providers distribute network service loads across the different NSHSs to achieve consistent service quality.

The success of the Internet is partly due to its simplicity. Network services can be implemented at the edges of a network without requiring special support from an Internet service provider. However, connectivity to the Internet itself still requires some support from the Internet service provider. By contrast, the Public Switched Telephone Network (PSTN) requires that every new network service, e.g., caller identification, be tightly integrated with the signaling architecture of the network. Although the telephony model simplifies security and accounting mechanisms used within the PSTN, the introduction of new network services is a substantial task as consistency must be maintained with existing network services at all layers of the architecture.

By applying network service semantics only at the endpoints of the network, i.e., points of interaction with the network, the Internet model naturally allows third-party network service creation. This is best evidenced in the World Wide Web (WWW). In the past, the WWW did not exist. Now Web browsing applications constitute the main volume of traffic over the Internet. Many other applications are growing in popularity, including those requiring media streaming, e.g., pointcast, and those once requiring consistent service quality such as music distribution, video on demand and packet telephony.

A large percentage of the above applications is server based. Customers use the advertised address of a service to connect to a server and receive a client's service. An interesting problem that arises is how to map the name of a network service to the server(s) that will fulfill the request. Many similarities can be found in the PSTN. The 800 toll-free service has the capability of routing a call to a pool of servers depending on the time of day, location of the caller and load on individual sites. However, the Internet currently does not have a standard for specifying services by name.

The only conventional name resolution scheme, the Domain Name Service (hereafter "DNS"; see P. Mockapetris, "Doman names: Concepts and facilities," IETF RFS 882, 1983), maps host-names to Internet Protocol (IP) network addresses. As a result, the procedure for resolving a network service name requires the inclusion of a host name to indicate the host server(s) providing the network service. DNS is then used to implicitly map a network service request to the network address of the associated host. Additional information in the network service descriptor is then used to contact the remote service at the obtained host address. This is, for example, the case for most WWW sites, and for Simple Mail Transfer Protocol (SMTP) e-mail servers.

Therefore, one problem with this model is that it ties the specification of a service to a host name. However, in many cases, it is desirable to completely separate the two, i.e., specify a network service independently of the network address of the host that provides the service, and instead use a translation function at the service level to map a network service request to a physical server(s). Such an architecture offers the advantage of allowing the service resolution task to use a variety of criteria including, but not limited to, the location of the client, load information from within the network, load and availability of the server pools, desired service quality, geographic, topological or organizational proximity, etc.

This problem is of particular interest to hosting Web services, since load balancing and spatial distribution of server pools are commonly needed in administering Web sites with high volumes of traffic. Moreover, multiple server sites are needed for redundancy, to maintain high availability and failure resiliency (i.e., restoration). Current web browsers (i.e., applications) retrieve data by resolving the "name of host"—part of the Universal Resource Locator (URL) using a DNS lookup, and then connecting to the host server(s) address returned by that DNS request to retrieve the data. For this reason, most approaches for "hiding" multiple servers behind one host name (e.g., www.att.com) use modifications of the existing DNS system.

Another common approach is the use of a re-director box at the gateway of a hosting site. The re-director appears to the rest of the Internet as a unique host address and directs incoming Hyper Text Transfer Protocol (HTTP) streams to a particular host server based on local load information or other criteria. The re-director box is a Network Address Translator (NAT), that changes the IP address of a virtual web host (i.e., the destination) to the IP address of the physical server supporting the network service and vice-versa in the reverse direction. The mapping must be kept the same for the duration of the HTTP flow to preserve the semantics of upper layer protocols such as Transmission Control Protocol (TCP), thus forcing the re-director box to perform flow detection and flow-based forwarding of subsequent packets. This approach does not scale well because all data, both the forward and reverse flow, must go through the re-director box for address translation. Additionally, adding more re-director boxes is complicated as it requires reverse path pinning to ensure that the reverse flow goes through the same re-director box. This complexity is further exasperated if the network service is hosted at multiple host sites.

Another disadvantage of DNS-based schemes stems from caching of host addresses by clients, reducing the efficiency of load and quality management. In particular, network service requests subsequent to an initial request may not connect to the closest or least loaded server. Recently, more elaborate schemes have taken into account the proximity of a client to a particular server using a combination of routing metrics and loading information. Although these schemes represent a significant improvement compared to the early DNS-based solutions, they still suffer from the same fundamental deficiency. That is, DNS-based schemes, although able to incorporate complex policies for load balancing, have the following disadvantages. First, network addresses can be cached at the client, preventing routing of individual connections for the same virtual host to different servers. Second, the routing of the connection inside the network is done based on the real address of the server rather than the address of the virtual host, preventing the implementation of customized routing policies. Third, packets flowing in the reverse direction cannot be easily aggregated for scheduling purposes.

On the other hand, redirection schemes work well for a single host site with many servers but have scalability problems when it comes to supporting groups of servers in different locations.

G. Goldszmidt and G. Hunt, "Scaling Internet Services by Dynamic Allocation of Connections," in Proceedings of the $6^{th}$ IFIP/IEEE Integrated Management, Boston, Mass., May, 1999, describes a scheme that uses a special router, i.e., a Network Director (ND) to distribute connections to a set of servers. The ND is located on the same ethernet with the servers. Every server has configured a number of virtual IP interfaces. Packets for a virtual host are first captured by the ND and then forwarded to an available server using the Media Access Control (MAC) address of the available server. The advantages of this scheme are that no modifications or encapsulation is needed in the packet headers and the return path does not involve the ND. It is, however, a local solution, since the ND and the servers must reside on the same local area network segment. This restriction can be removed but only using a tunneling solution. Specifically, the ND encapsulates a first packet from the client in a second packet and sends the second packet to the host site identified using the arbitrary and complex policies. The header of the second packet is attached to the front of the header of the first packet. The receiving host site then communicates with the client directly without going through the ND.

Cisco Corporation has recently introduced a distributed director product that acts either as a DNS resolver or an HTTP re-director. In the first mode, whenever it receives a DNS query for a virtual host, it initiates a procedure that locates a server with the best proximity metric. The metric is computed based on the physical distance of the server and the client (combining information from routing protocols) and load information on the server. When acting as re-director, it only processes HTTP requests and replies to the client with an HTTP redirect message with the address of the server that can accommodate the request. However, the problem with this approach is that most browsers do not properly handle redirection requests.

SUMMARY OF THE INVENTION

Rather than relying on address resolution or redirection schemes at the edges of a network, the exemplary embodiments of the invention enable the network itself to be aware of the services existing at its edges and to route connection requests for these services to the appropriate servers based on a variety of criteria. By making the network service-aware, routing functions can be implemented in a more scalable and efficient way.

According to the exemplary embodiments of the invention, when a network service request is input by a network service client or client customer to a network such as the Internet, the service request is routed based on arbitrary and/or complex policies to a server that can fulfill the network service request. However, the application of such policies is performed transparently to the client.

According to a first exemplary embodiment of the invention, a single level of selection is performed. This exemplary embodiment performs selection among a plurality of servers located at a single host site using a site-specific Service Level Router (SLR). The service request is routed to the server that is most appropriate to handle the request. A determination of which server is most appropriate may be based on a configurable routing policy based on a load, cost, or proximity metric or some other arbitrary criteria.

According to a second exemplary embodiment of the invention, two levels of selection are performed: one at the physical host site level and one at the server level. This exemplary embodiment performs selection among a plurality of servers at a single host site using a site-specific SLR and performs selection among a plurality of physical host sites (e.g., a server fame containing a plurality of servers) using a system-specific SLR. The service request is routed to the host site that is most appropriate to handle the request. A determination of which host site is most appropriate may be based on a configurable routing policy based on a load, cost, or proximity metric or some other arbitrary criteria. The service request is then routed to the server at the host site that is most appropriate to handle the request and routed to the server within that host site that is most appropriate to handle the request. A determination of which server is most appropriate may be based on a configurable routing policy based on a load, cost, or proximity metric or some other arbitrary criteria.

According to a third exemplary embodiment of the invention, three levels of selection are performed: one at a system level, one at the site level and one at the server level. This exemplary embodiment performs selection among a plurality of servers at a single host site, performs selection among a plurality of host sites (each incorporating a plurality of servers). The service request is routed to an Autonomous System (AS) that is most appropriate to handle the request using a network-level SLR. A determination of which AS is most appropriate may be based on a configurable routing policy based on a load, cost, or proximity metric or some other arbitrary criteria. The service request is routed to the physical host site that is most appropriate to handle the request using a system-specific SLR. A determination of which physical host site is most appropriate may be based on a configurable routing policy based on a load, cost, or proximity metric or some other arbitrary criteria based in some part on the client or client customer originating the request. The service request is then routed to the server at the physical host site that is most appropriate to handle the request using a site-specific SLR and routed to the server within that host site that is most appropriate to handle the request. A determination of which server is most appropriate may be based on a configurable routing policy based on a load, cost, or proximity metric or some other arbitrary criteria.

Multiple levels of selection are beneficial because they provide scalability. ASs, physical host sites and servers may be selected geographically, e.g., by continent, by geographical region, etc.

A Service Level Router (SLR) that is geographically far away knows nothing about individual servers; it only knows about the existence of a physical host site (i.e., a site comprising a plurality of constituent servers sharing a mutual communication/control network to provide a service). In all of the exemplary embodiments, each physical host site has its own SLR. The physical host site SLR has and uses information about the host site's constituent servers to handle service requests. In the second and third exemplary embodiments, each AS has its own SLR. The trust domain SLR has and uses information about the AS's constituent physical host sites to handle service requests. In the third exemplary embodiment, a network SLR is located within the network and has and used information about the various ASs to route service requests.

These, and other features and advantages of this invention are described in or are apparent from the following detailed description of the system and methods according to this invention.

One aspect of the exemplary embodiments addresses how to route connections for a virtual host (e.g., www.att.com) to a least loaded server by operating at the network layer and without using a DNS-based scheme.

Another aspect of the exemplary embodiments addresses how to aggregate traffic to and from a service in order to provide quality of service guarantees of different granularities.

Another aspect of the exemplary embodiments addresses how to both route connections for a virtual host and aggregate traffic, as above, in a scalable and efficient way without introducing overwhelming complexity in the network core and in a way completely transparent to the clients.

Another aspect of the exemplary embodiments addresses how to implement such a scalable system using commercially available hardware.

BRIEF DESCRIPTION OF THE DRAWINGS

The benefits of the present invention will be readily appreciated and understood from consideration of the following detailed description of the exemplary embodiments of this invention, when taken with the accompanying drawings, in which same numbered elements are identical and.

DETAILED DESCRIPTION OF EXEMPLARY EMBODIMENTS

Throughout the explanation of the exemplary embodiments of the invention, the term "service level routing" refers to the capability of routing flows to host site servers implementing a named network service. Every network service is associated with the IP address of a virtual host, that, in theory, provides the service. A virtual host and the network service it provides appear to the rest of a network, e.g., the Internet, as a physical host site, having a single IP address. However, the virtual host can correspond to different physical host sites, determined in real-time through a service level routing map.

Figure 1:
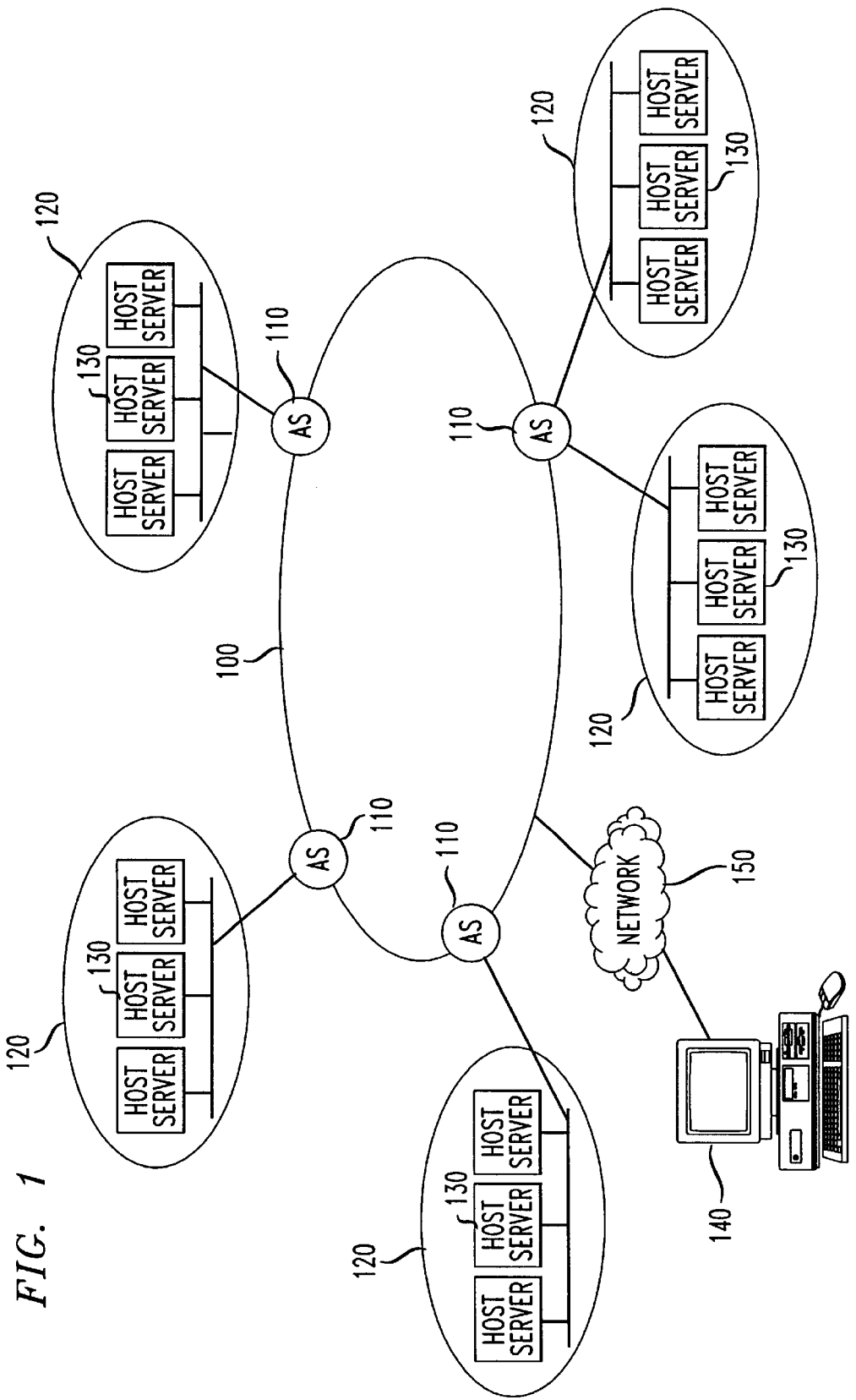
FIG. 1 is an illustration of a system that utilizing a system for managing network service load and reliability in accordance with the exemplary embodiments of the invention.

The exemplary embodiments of the invention relate to service level routing implemented in relationship to a Trust Domain (TD) that includes one or more ASs. As shown in FIG. 1, a TD 100 includes one or more ASs 110 that interact with other ASs 110 in the TD 100 and entities outside the TD 100. A client or client' customer originating a service request at a terminal 140 interacts with the TD 100 and its constituent entities using a network 150, which may be, for example, the Internet. Each AS 105 is home to one or more physical host sites 120. Each physical host site 120 includes one or more host servers 130.

It is foreseeable that an AS 105 is a backbone network of an Internet Service Provider (ISP), in which the host servers 130 at each physical host site 120 are shared by multiple clients, each potentially providing multiple services.

The primary function of service level routing is the mapping of a virtual host address to a physical server address. This mapping can be performed in several stages, involving more than one SLR cluster. The SLR clusters manage the flow identification by specifying filters and can trigger flow-based forwarding. However, SLR clusters must perform the basic forwarding function until the flow-based forwarding takes place. In accordance with the exemplary embodiments explained herein, SLR clusters may exist both within an AS, typically at the ingress border of an AS (as a system-specific SLR cluster) and at the gateway of every server farm (as a site specific SLR cluster) as well as outside an AS entirely (as a network-level SLR cluster). Network-level SLR clusters may route a network service request to a particular AS. System-specific SLR clusters may route network service requests for a virtual host to a particular physical host site. Site-specific SLR clusters may further direct the connection to a particular host server. Network-level SLR clusters can advertise within a public network, such as the Internet, the virtual host address as its own. The system-specific SLR clusters can advertise to a public network, such as the Internet, the virtual host address, as its own. The site-specific SLR clusters can advertise the virtual host address to the system-specific SLR clusters along with cost metrics.

Network services are provided by host servers. Each network service request from a client or client' customer is tunneled to a single physical host server. Every host server is capable of providing or supporting multiple network services, potentially each corresponding to a different network service client. For example, one host server may host a web service for three virtual host clients, a multimedia streaming service for a number of audio distribution clients, etc.

Accordingly, an IP processing stack at the host servers may have a regular IP address for every physical network interface, a number of virtual host IP addresses corresponding to every virtual host that the host server supports and tunnel termination capabilities for extracting packets coming through an IP tunnel. Because a host server may support a larger number of virtual hosts, making address administration cumbersome, a subnet address may be configured as a virtual interface. For example, 192.192.*.* can be a virtual host subnet address. IP packets with destinations in this range would be accepted by the physical server, as if the destination address was the address of a local interface. This facility does not generally exist in currently available servers.

Tunneling abstraction may be realized in a number of ways, most simply by using an IP-in-IP encapsulation, but may also be realized as a lower level connection (ATM, MPLS or WDM). In particular, as proposed in G. Goldszmidt et al., "Scaling Internet Services by Dynamic Allocation of Connections", supra, if a site-specific SLR cluster and the servers located at that site communicate over a fast ethernet, the site-specific SLR cluster can "tunnel" data packets to a host server using the host server's MAC address. Data packets transmitted in the reverse direction may obtain the address of the original virtual host and thus, maintain transparency and consistency at the transport layer.

Each physical host site may include one or more host servers. Conversely, each host server may provide service support for a number of virtual hosts. A physical host site is accessible through a limited number, e.g., one or two, of gateway routers and has one or more SLR clusters. Multiple physical host sites supporting the same network service provide scalability, redundancy and manageability. Sharing each host server among multiple network services provides efficient resource allocation through statistical multiplexing.

Additionally, because resources may be shared between virtual hosts (e.g., clients), it is possible and may be desirable to differentiate the level of service that every client or client' customer receives. A server farm should be capable of partitioning both computing resources as well as networking resources at its access point.

Figure 2:
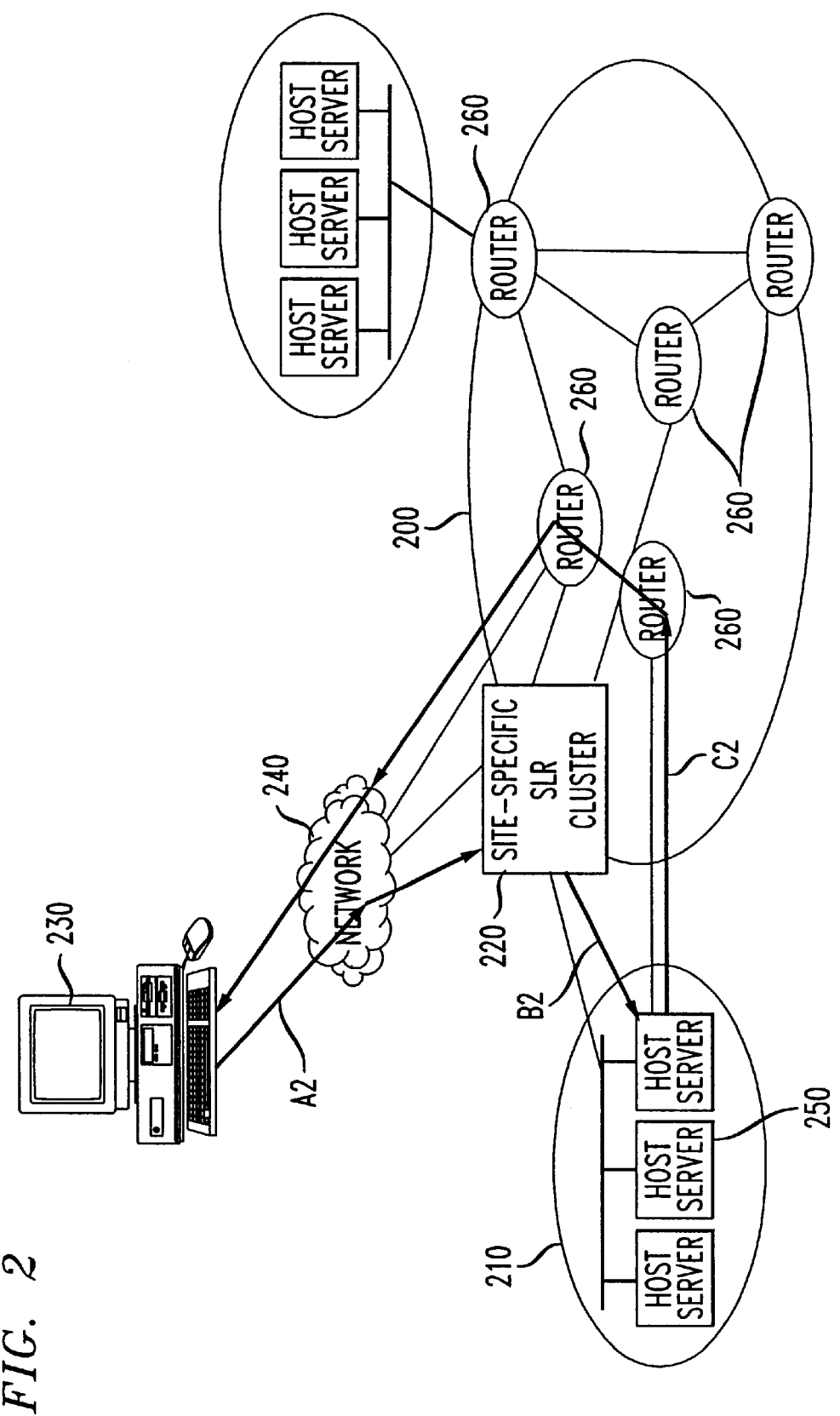
FIG. 2 is an illustration of a system that utilizing a system for managing network service load and reliability in accordance with the first exemplary embodiment of the invention.

In the first exemplary embodiment of the invention, service level routing is performed by a site-specific SLR cluster in a single set of process steps. Specifically, network service requests are directed to a site-specific SLR cluster that directs the service requests to a particular host server within the physical host site. As shown in FIG. 2, an AS 200 includes a physical host site 210 with its own site-specific SLR cluster 220. The site-specific SLR cluster 220 receives network service requests from client or client' customer terminals, e.g., terminal 230, coupled to the SLR cluster 220 through some type of network 240, which may be the Internet. The site-specific SLR cluster 220 is located at the entry gateway to the physical host site 210. The site-specific SLR cluster 220 directs the network service request to a particular hosting server 250 within the physical host site 210 hosting the network service. The hosting server 250 than responds to the service request by, for example, providing the requested service to the client or client' customer at terminal 220.

However, the hosting server 250 is not bound to respond to the service request on the same transmission path traveled by the service request. Therefore, the response may be transmitted on a different path through various routers 260 in the TD 200 for any number of reasons including, path load, transmission cost, reliability, available bandwidth, etc.

In the second exemplary embodiment of the invention, the service level routing is performed by two levels of SLRs: a site-specific SLR cluster and a system-specific SLR cluster. The system-specific SLR cluster directs service requests to a particular physical host site within an AS; the site-specific SLR cluster directs the service requests to a particular hosting server within the physical host site. The system-specific SLR cluster is located at an entry gateway to the AS. The site-specific SLR cluster is located at the entry gateway to the physical host site.

Figure 3:
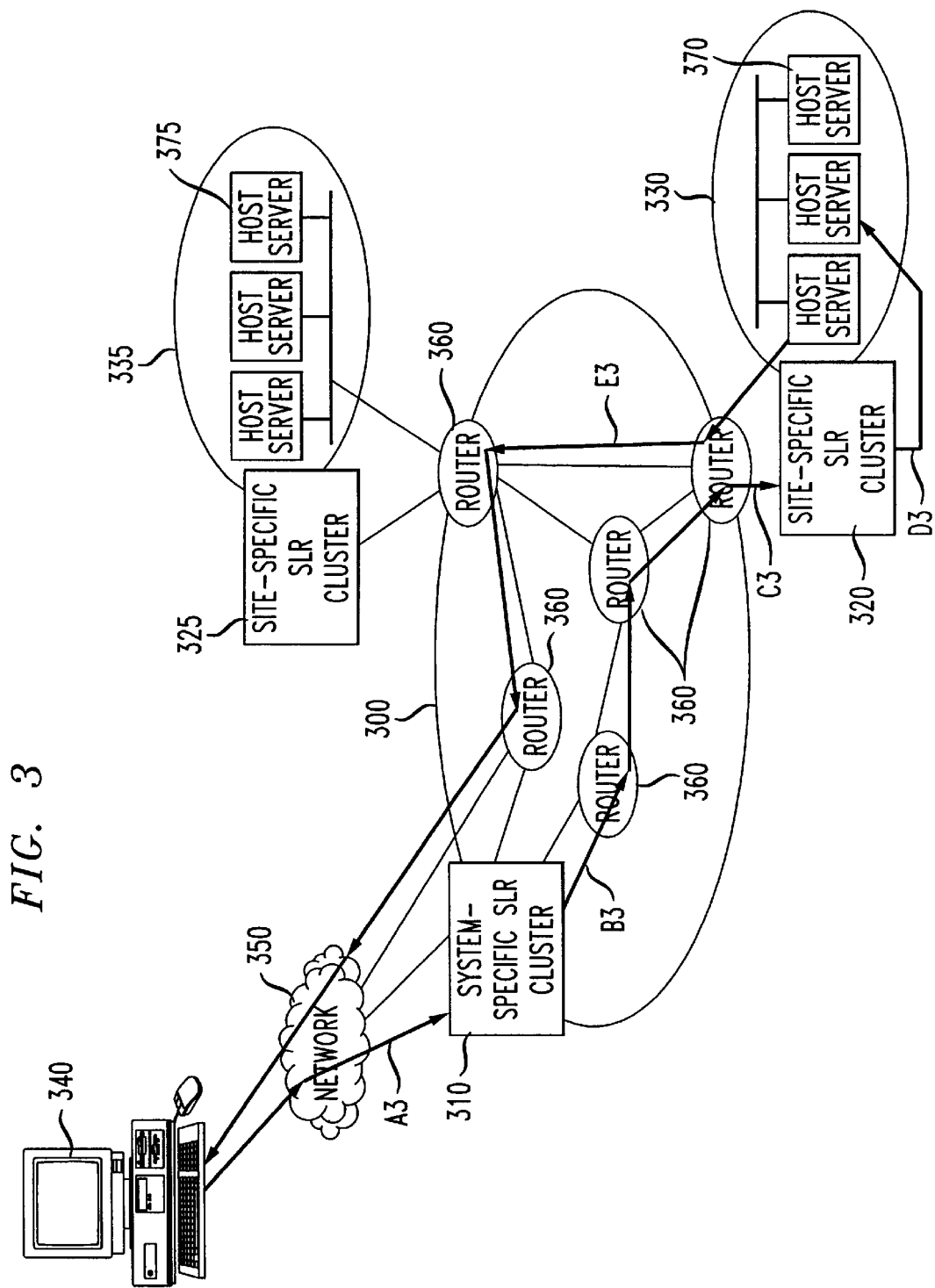
FIG. 3 is an illustration of a system that utilizing a system for managing network service load and reliability in accordance with the second exemplary embodiment of the invention.

As shown in FIG. 3, an AS 300 includes both a system-specific SLR cluster 310 specific to the AS 300 and a plurality of site-specific SLR clusters 320 each specific to physical host sites 330 within the AS 300. The system-specific SLR cluster 310 receives network service requests from user terminals, e.g., user terminal 340, coupled to the AS 300 through some type of network 350, which may be the Internet. The system-specific SLR cluster 310 directs the network service request through routers 360 in the AS 300 to a site-specific SLR cluster 320. This site-specific SLR cluster 320 is specific to a physical host site 330 that provides the requested network service. The physical host site 330 includes at least one host server 370 that supports the requested network service.

The AS 300 also includes at least one other site-specific SLR cluster 325 specific to at least one other physical host site 335 that includes at least one host server 375 that also provides the request network service. The host servers 370, 375 locally advertise the names of each of their virtual hosts to their respective site-specific SLR clusters 320, 325. The site-specific SLR clusters 320, 325 then advertise the union of virtual hosts and their addresses to the system-specific SLR cluster 310 that acts as a gateway router of the AS 300. The system-specific SLR cluster 310 advertises the union of virtual hosts and their addresses to entities outside the AS 300, e.g., user terminal 340. The system-specific SLR cluster 310 advertises the IP-addresses of the virtual hosts as its own.

Routers 360 within the AS 300 receive route advertisements from multiple site-specific SLR clusters 320, 325, appearing as if there were multiple paths to the same virtual host. For each virtual host, the routing protocol selects one of these routes, thereby selecting a site-specific SLR cluster 320 or 325 where it will direct traffic to that virtual host. This selection may be performed based on a load, cost, or proximity metric or some other arbitrary criteria.

Externally, the system-specific SLR cluster 310 of the AS 300 advertises the virtual host IP address for the selected site-specific SLR cluster 320 or 325 for each network service. External routers such as those included in the network 350 route network service requests towards the AS 300 without an understanding that the AS 300 may include multiple physical host sites 330, 335 including multiple servers 370, 375 that provide the requested network service.

As illustrated in FIG. 3, connection requests for network services provided by a virtual host may be received in original data flow A. In one example of the operation of the second exemplary embodiment of the invention, the network service requests are identified at the borders of the AS 300. The system-specific SLR cluster 310 at the input/output gateway of the AS 300 provides entry to a tunnel B across the AS 300 to a site-specific SLR cluster 320. The site-specific SLR cluster 320 provides entry to a tunnel C to a host server 370 at the physical host site 330. The site-specific SLR cluster 320 also terminates the tunnel B across the AS 300 to extract the enclosed datagrams. The host server 370 terminates the tunnel C and recovers the original datagram exactly as it was sent from the client or client' customer terminal 340.

From the addresses in the original datagram the host server 370 learns the client or client' customer IP address as well as the virtual host address associated with the network service request. Acting as the virtual host, the host server 370 transmits its replies D to the client or client' customer network service request directly to the requesting client or client' customer terminal 340 using the address of the virtual host as its source address.

Although the second exemplary embodiment of the invention may be used to map a virtual host address to a real one, the effect to the outside world is the availability of virtual host services. This is because Internet host names are present in all service-level addresses (URLs being the most typical example). The SLR architecture decouples the name of a network service from the physical location of the hosting servers supporting or providing that network service.

In the third exemplary embodiment of the invention, the service level routing is performed by three levels of SLRs: a site-specific SLR cluster, a system-specific SLR cluster and a network-level SLR cluster. The network-level SLR cluster directs service requests to a particular AS. The system-specific SLR cluster directs service requests to a particular physical host site within an AS. The site-specific SLR cluster directs the service requests to a particular hosting server within the physical host site. The network-level SLR cluster is located within a public network, e.g., the Internet. The system-specific SLR cluster is located at an entry gateway to the AS. The site-specific SLR cluster is located at the entry gateway to the physical host site.

Figure 4:
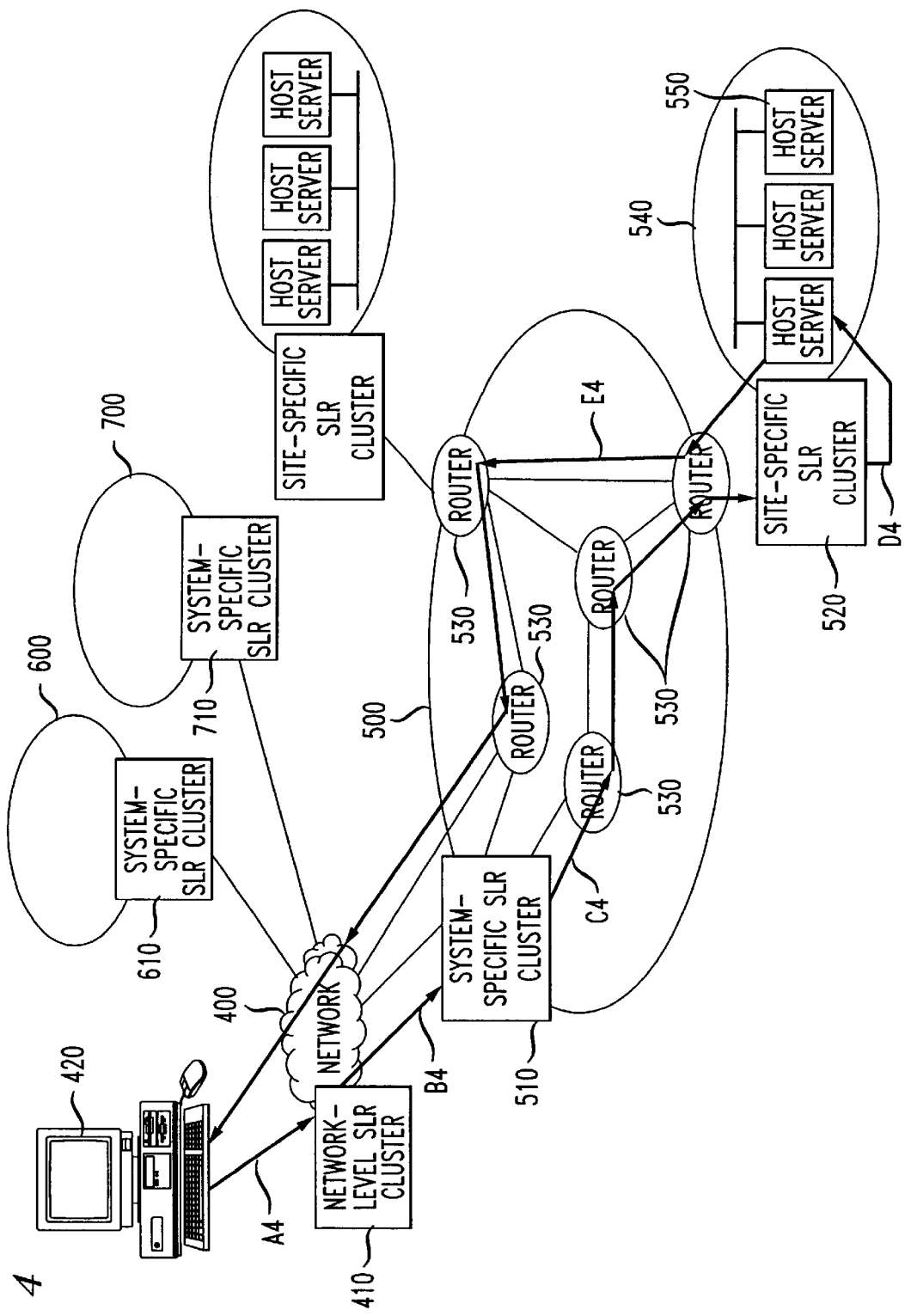
FIG. 4 is an illustration of a system that utilizing a system for managing network service load and reliability in accordance with the first exemplary embodiment of the invention.

As shown in FIG. 4, a network 400 includes a network-level SLR cluster 410, a plurality of ASs 500, 600, 700 and at least one client or client' customer terminal 420 coupled together via the network 400. Each of these ASs include a system-specific SLR cluster 510, 610, 710 specific to the ASs 500, 600, 700, respectively. Although the entities within the ASs 600 and 700 are omitted, the entities in those ASs are similar to those depicted as part of AS 500. AS 500 includes a system-specific SLR cluster 510 and a plurality of site-specific SLR clusters 520, 525 each specific to physical host sites 530, 535, respectively within the AS 500. The network-level SLR cluster 410 receives network service requests from client or client' customer terminals, e.g., client or client' customer terminal 420, coupled to the network 400, which may encompass the Internet or any other public or private network.

The network-level SLR cluster 410 selects a system-specific SLR cluster 510, 610 or 710 as the destination for the network service request. The selection may be based on, for example, on a load, cost, or proximity metric or some other arbitrary criteria. Once the system-specific SLR cluster has been selected, the network-level SLR cluster 410 directs the network service request to the selected system-specific SLR cluster, for example, system-specific SLR cluster 510.

The system-specific SLR cluster 510 receives the network service request from the network-level SLR cluster 410. The system-specific SLR cluster 510 directs the network service request through routers 540 in the AS 500 to a site-specific SLR cluster, for example, site-specific SLR cluster 520. This site-specific SLR cluster 520 is specific to a physical host site 530 that provides the requested network service. The physical host site 530 includes at least one host server 550 that supports the requested network service.

The AS 500 also includes at least one other site-specific SLR cluster 525 specific to at least one other physical host site 535 that includes at least one host server 555 that also provides the request network service. The host servers 550, 555 locally advertise the names of each of their virtual hosts to their respective site-specific SLR clusters 520, 525. The site-specific SLR clusters 520, 525 then advertise the union of virtual hosts and their addresses to the system-specific SLR cluster 510 that acts as a gateway router of the AS 500. The system-specific SLR cluster 510 advertises the union of virtual hosts and their addresses to entities to the network-level SLR cluster 410. The network-level SLR cluster 410 advertises the IP-addresses of the virtual hosts as its' own.

Routers 540 within the AS 500 receive route advertisements from multiple site-specific SLR clusters 520, 525, appearing as if there were multiple paths to the same virtual host. For each virtual host, the routing protocol selects one of these routes, thereby selecting a site-specific SLR cluster 520 or 525 where it will direct traffic to that virtual host. This selection may be performed based on a load, cost, or proximity metric or some other arbitrary criteria. The system-specific SLR cluster 510 of the AS 500 advertises the virtual host IP address for the selected site-specific SLR cluster 520 or 525 for each network service as its' own. The network-level SLR cluster 410 advertises the virtual host IP address for the selected site-specific SLR cluster 520 or 525 for each service as its' own.

Routers other than the network-level SLR cluster 410 included in the network 400 route network service requests towards the network-level SLR cluster 410 without an understanding that the network-level SLR cluster 410 is coordinating transmission to various ASs 500, 600, 700, each of which may include multiple physical host sites 530, 535 including multiple servers 550, 555 that provide the requested network service.

As illustrated in FIG. 4, connection requests for network services provided by a virtual host may be transmitted from a client or client's customer in original data flow A4. In one example of the operation of the third exemplary embodiment of the invention, the network service requests are identified at the borders of the network 400. The network-level SLR cluster 410 provides entry to a tunnel B4 across the network 400 to a system-specific SLR cluster, for example, system-specific SLR cluster 510. The system-specific SLR cluster 510 provides entry to a tunnel C4 across the AS 500 to a site-specific SLR cluster, for example, 520. The site-specific SLR cluster 520 provides entry to a tunnel D4 to a host server, for example, 550, at the physical host site 540.

The system-specific SLR cluster 510 also terminates the tunnel B4 across the network 400 to extract the enclosed datagrams. The site-specific SLR cluster 520 terminates the tunnel C4 to extract the enclosed datagrams. The host server 550 terminates the tunnel D4 and recovers the original datagram exactly as it was sent from the client or client' customer terminal 420.

From the addresses in the original datagram the host server 550 learns the IP address of the client, or client's customer, terminal 420 as well as the virtual host address associated with the network service request. Acting as the virtual host, the host server 550 transmits its replies E4 to the network service request directly to the requesting client or client' customer terminal 420 using the address of the virtual host as its source address using routers 530 in network 500. In other words, the request response need not be transmitted on the same transmission path traveled by the request. The routers 530 may be any commercially available router, but preferably are high-speed routers.

Although the third exemplary embodiment of the invention may be used to map a virtual host address to a real one, the effect to the outside world is the availability of virtual services. This is because Internet host names are present in all service-level addresses (URLs being the most typical example). As in the first two exemplary embodiments, the SLR architecture decouples the name of a network service from the physical location of the hosting servers supporting or providing that network service.

In all of the exemplary embodiments, the routing decisions performed at each set of steps are based on a variety of criteria, such as reachability, availability, network load, AS load, physical host site or server load, service contracts, Quality of Service (QoS) requirements, etc.

When a virtual host for providing a client's service to its' customers is served by multiple physical host sites, the network access SLR cluster may exploit the multiplicity of physical host sites to achieve higher aggregate performance by directing different client's customers' requests for the same client's service to different physical host sites. If the physical host sites are geographically or topologically separate it may be assumed that (transient) congestion, and therefore throughput variations, are independent from one physical host site to another. If multiple simultaneous connections from a single client for its services are routed to different physical host sites, variation in throughput due to (transient) congestion on one connection would not affect the others. The net result may be more stable throughput to the client, as the group of connections makes progress while individual ones may be stalled.

The exemplary embodiment of the SLR cluster is designed so that it need not be run on a network router, but instead might run on a network resident server. By allowing network service request responses from a selected server to travel to the requesting client or customer. This operation minimizes traffic through the SLR cluster, exploiting a fast path router forwarding for the majority of packets.

The exemplary embodiments of the invention, may support a backbone architecture for a public network such as the Internet capable of identifying service requests for a virtual host and routing them to an appropriate host server at a physical host site using multiple levels of tunneling. Once a flow has been identified, the tunnels can be bypassed by using a "pinned-down" fast path through high performance routers.

The policy for routing connections may be based on a state update protocol that distributes aggregated resource availability information between the different levels of routing. Client defined routing policies for each virtual host can be easily incorporated in this mechanism.

As explained above, the exemplary embodiments of the invention are based on the concept of IP tunneling. At lower layers, other mechanisms such as Asynchronous Transfer Mode (ATM) connections or Multi-Protocol Label Switching (MPLS) paths (see "A Framework for Multiprotocol Label Switching", R. Callon, P. Doolan, N. Feldman, A. Fredette, G. Swallow, and A. Viswanathan, work in progress, Internet Draft, November 1997.) may be employed to implement the tunnels.

One significant function of the architecture illustrated in FIGS. 2–4 is the resulting capability of mapping of a virtual host destination address to one or more physical server destinations. This virtual address resolution takes place in multiple steps, similar to hop-by-hop routing on the Internet. At the network level, the concept of virtual address resolution implies determining an AS. In the system-specific SLR clusters, the concept of virtual address resolution implies determining the physical host site. However, for site-specific SLR clusters virtual address resolution requires selecting a hosting server. In addition to the virtual domain address, routing decisions may depend on a destination port number, a source address and port, an application level header and availability and load information. In particular, site-specific SLR clusters may use information about server load, network load within the physical host site, and even application level information such as a type or size of data being retrieved. In such a way, routing functions are, in general, service, load and even request sensitive.

Service level routing requires identification of data flows in an AS and mechanisms to map flows into tunnels. Invariably, a network service request is an application level connection setup (e.g., TCP) establishing a bi-directional data flow from a client or client' customer requesting a network service to a server that can provide that network service. In a datagram network like the Internet, each data packet is, by default, routed independently towards a destination, whether it be a client IP address of a server IP address. Service level routing may change dynamically as dictated by a network service load management policy based on changes in availability and load. Rerouting diagrams of existing data flows to different host servers breaks all these connections.

To avoid this, in accordance with the exemplary embodiments of the invention, each network service request is treated as a data flow request, with datagrams that are subsequent to a first datagram of the data flow being forwarded to the same destination as the original request. It should be appreciated that, apart from the data's destination, the routes for data packets may be different. Therefore, network level routing changes do not break ongoing connections.

The membership of a packet flow is determined by a flow classifier, running a matching filter against a number of fields in the packet. Whereas, theoretically, the flow classification can allow a general equivalence relation on any part of a datagram and application level headers, the filter will typically match any or all of the following: source address, destination address and port number(s).

It should be appreciated that according to the exemplary embodiments, the SLR clusters may need to include control logic to specify a filter, and associate with it an appropriate forwarding action, as well as signaling mechanisms allowing the SLR clusters to trigger these mechanisms. A variation of Reservation Protocol (RSVP) may suffice for this purpose, as may other existing flow classifiers and short-cutting mechanisms.

The architecture of the network load and service load and reliability management networks in accordance with the exemplary embodiments of the invention use scheduling in three dimensions for service differentiation and guarantees: (1) link level scheduling of bandwidth; (2) scheduling of processing resources; and (3) scheduling of disk input/output at host servers. No explicit assumptions should be made about the granularity of such guarantees as those may vary with server implementations, needs and service contracts. Guarantees, and therefore scheduling, may be provided for an individual data flow, but may also be provided only at an aggregate level, for example, for a particular virtual host.

More generally, a hierarchical scheduler may be used to provide multiple levels of resource sharing (See, P. Goyal, X. Guo, and H. M. Vin "A Hierarchical CPU Scheduler for Multimedia Operating Systems," in Proceedings of the Second Symposium on Operating Systems Design and Implementation, pages 107–121, October 1996, and P. Goyal, H. M. Vin, and H. Cheng, "Start-time Fair Queuing: A Scheduling Algorithm for Integrated Services Packet Switching Networks," in Proceedings of ACM SIGCOMM'96, pages 157–168, August 1996). As an example, it may be preferable for a farm of host servers to allocate 20% of its access bandwidth to a backbone for serving web traffic of client X, 30% for serving audio streams of client Y, etc. Since the data packets in the reverse direction, i.e., from the farm of host servers to the client, contain the virtual host address, it is possible to aggregate them into a single queue at an access router, e.g., the site-specific SLR cluster, and allocate a portion of the total bandwidth to each constituent queue. Further, it is foreseeable that more than one access point exists to the SLR backbone. In this case it is possible to specify a different bandwidth share at every access link.

One benefit of the exemplary embodiments of the invention is in the simplification of aggregate scheduling and accounting for network management because physical host site service contracts will typically specify some aggregate performance guarantees. By simplifying aggregate scheduling, guarantees may be more easily met, and by simplifying accounting, these contracts may be more easily managed.

Another benefit of the exemplary embodiments of the invention is to enhance service manageability transparently to clients and clients' customers. Therefore, system architecture according to the exemplary embodiments does not change clients' customers, nor the perceived service model of end-systems. The assumed client or client' customer behavior is that of a typical web-browser, where the application resolves a host name into an IP address using, for example, a DNS, after which the application starts transmitting data packets with the returned address as a destination. Transparency means that host virtualization should not be detectable at the clients' customers, implying that all mappings or address translations must be nullified for the reverse flow. In particular, datagrams arriving at a client's customer should have the address of the virtual host as the source address.

Conventionally, rigid transparency requirements have been lightened in HTTP specific solutions by exploiting the HTTP redirect capabilities. Instead of merely forwarding a network service request, a redirect proxy can act as the virtual host, while redirecting all network service requests to the IP address of a physical server.

In contrast, the exemplary embodiments of the invention use an approach that is more general because it is independent of service specific protocols, and supports multiple levels of redirection, enhancing scalability.

As explained in connection with FIGS. 2–4, data packets are forwarded by conventional routers as well as the SLR clusters throughout a public network, within an AS, etc. The use of tunnels between SLRs allows the core of a network or AS to employ such conventional routers. Routers capable of classifying packet streams into flows, and acting as a tunnel entry or exit allow SLRs to better leverage high performance routers typically deployed in ISP backbones as explained below.

Figure 5:
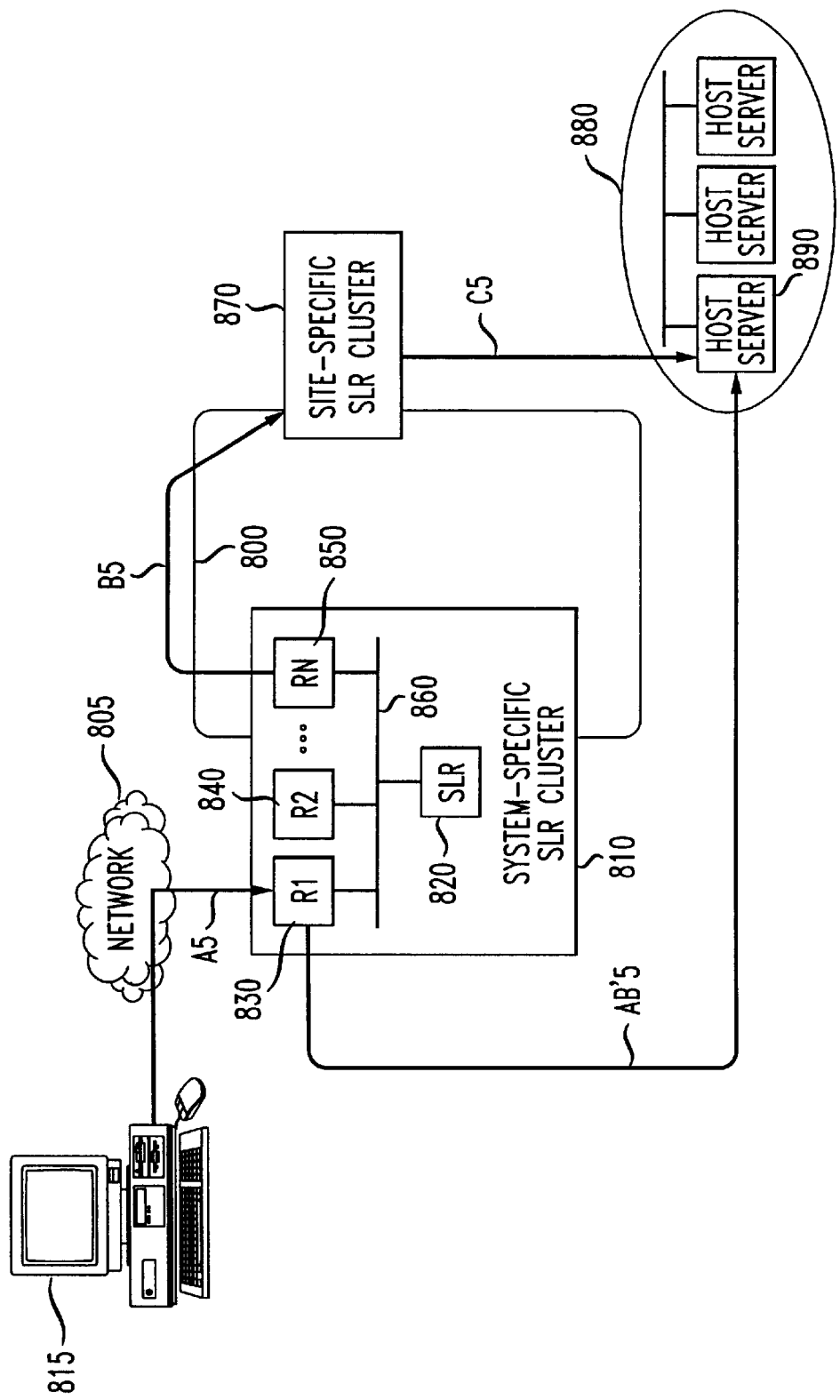
FIG. 5 is an illustration of one exemplary embodiment of an SLR cluster.

SLRs may be positioned at peering points to a public network, such as the Internet, corporate networks or at the gateways to a physical host site. The SLR functionality is implemented in software, and therefore can run on a general purpose computer. However, as explained above, it is preferred that an SLR operate in conjunction with one or more high performance routers. The term SLR cluster used throughout this specification is meant to include a combination of an SLR with one or more of these high performance routers. FIG. 5 illustrates one exemplary architecture by which various level SLR clusters interact with each other an a client or client' customer terminal.

As shown in FIG. 5, the system-level SLR cluster 810 may include an SLR 820, and a plurality of routers 830–850. The SLR 820 and the plurality of routers SLR 830–850 may be coupled together via a fast Ethernet 860. The links A5 and B5 indicate the initial path of a data flow to a virtual host corresponding to a site-specific SLR cluster 870. Routers 830–850 (R1–RN) are the routers within the SLR cluster 810.

Router 830 is the router that connects the system-specific SLR cluster 810 to a public switched network 815, such as the Internet. Initially, router 830 forwards the data flow it receives from the client or client's customer terminal 815 to the SLR 820 via the fast Ethernet 860. The SLR 820 in turn tunnels data flow to a site-specific SLR 880 in the site-specific SLR cluster 870 via tunnel B5. The site-specific SLR cluster 870 serves as the gateway to the physical host site 880. The site-specific SLR cluster 870 then tunnels the data flow to one host server of a plurality of host servers 880 supporting the virtual host via a tunnel C5. Once the host server 890 has been determined, the flow can bypass the two SLRs, by instructing router 830 to tunnel the data packets directly to the selected host server 890 along path ABC'5 using the real IP address of the host server 890.

However, it should be appreciated that is not necessary but is only preferable to bypass an original path of SLRs as shown in FIG. 5. A system that does not bypass an original path of SLRs is functionally complete and improves network load and reliability management, without further mechanisms, by managing data flow towards and from a virtual host always passing through service level routers.

Nevertheless, without specialized components, such data flow management imposes a significant performance hit as service level routing is performed above the level of fast-path forwarding. In fact, to maintain the separation of concerns of different layers of abstraction and to promote the use of commercially available components, it may be preferable to implement an SLR on a host (as a user level process) rather than on a router. This issue is of particular importance when the transient AS is an ISP backbone with high capacity links and high performance forwarding equipment. In particular, many ISP backbones may employ Asynchronous Transfer Mode (ATM) switches or Multiprotocol Label Switching (MPLS) Link State Protocol Data Units (LSPs) whose forwarding paths are mostly implemented in hardware. Therefore, to avoid this performance penalty, and to better exploit the forwarding capabilities of more optimized while commercially available hardware, the exemplary embodiments of the invention may include mechanisms to bypass SLRs for subsequent packets of data flow.

This may be done by, for example, using tunnel abstraction. As described above in connection with the second exemplary embodiment, a site-specific SLR cluster can terminate a tunnel from a system-specific SLR cluster, select an appropriate host server and tunnel the arriving datagrams to that host server. To facilitate this type of bypassing, i.e., short-cutting, the site-specific SLR cluster must also transmit the selected host server address to the upstream, system-specific SLR, thus enabling a most upstream router of the system-specific SLR cluster to tunnel subsequent datagrams directly to the selected host server address. In typical ISP backbones this would provide optimal routing within the ISP domain. Moreover, if the request is establishing a TCP connection, the shortcut will most often be established before the first data packet (e.g., after the SYNC packet) arrives, resulting in the SLRs routing only one packet per TCP connection.

In such a scheme, three mechanisms required in an upstream router included in an SLR cluster are: a flow classifier, tunneling, and signaling to trigger and associate the two. The first two are supported in conventional routers. In particular, nodes translating from IP to ATM (or MPLS) use IP flow classification to determine to which ATM Virtual Call (VC) to forward an IP packet. In that case, the ATM VC is the tunneling mechanism used.

Declaring a flow classifier is part of RSVP, but the association of a flow to a tunnel is not. Accordingly, practice of such a scheme involves defining a new RSVP object, e.g., a tunnel object, for this purpose. Its only information field is the IP-address of the tunnel termination point. As explained above, in relationship to FIG. 5, this is always the selected host server.

As explained above, a virtual hosting can be realized at more than one server farm. This may be performed to exploit geographic and topological proximity, or for redundancy and reliability reasons. The number and location of physical host sites, i.e., server farms, may change dynamically. Although under normal operating conditions, the time-scale of change might be significant, when failures occur, it might be essential to quickly update the set of server farms, and particularly the presence of server farms. A network carrier might, for example, offer a disaster recovery service, maintaining a redundant mirror physical host site, which under normal operation would not be active, but would engage when the main physical host site fails. In yet another scenario, the main physical host site may be hosted at a customer premises, thus, requiring virtualization from within the network at the customer premises to a backup physical host site during server failures within the main physical host site.

When a network-level SLR cluster, system-specific SLR cluster at the border of a network backbone, or site-specific SLR cluster receives a packet destined for a virtual host, it performs a lookup to identify whether it belongs to an existing "recognized" flow. If the flow lookup succeeds, the packet follows the path associated with the flow. If the packet belongs to a connectionless service such as User Datagram Protocol (UDP), or is one of the first packets of a newly detected flow for which there is no "pinned-down" path yet, a flow label is assigned and the packet is tunneled to a next SLR cluster (hop) by prepending a new IP header. The next hop is determined through an SLR routing policy described in connection with FIGS. 6–8, below.

Figure 6:
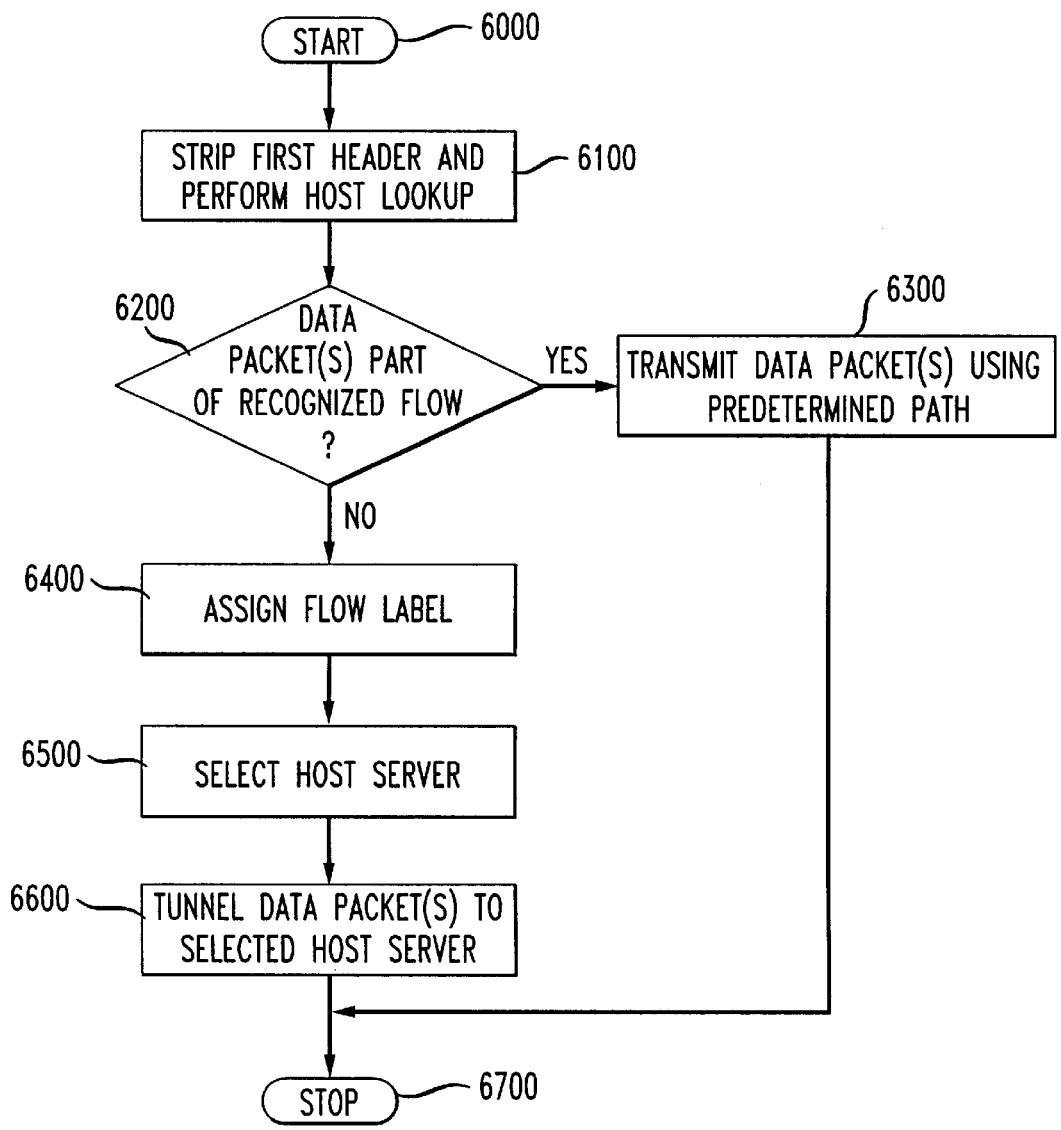
FIG. 6 is a flow chart illustrating a method for routing network service requests in accordance with the first exemplary embodiment of the invention.

FIG. 6 illustrates a method for routing a data packet(s) containing, e.g., a network service request received at a site-specific SLR cluster from a network service client or client' customer and destined for a virtual host providing that network service. The method determines through an SLR routing policy to which host server of a set of host servers at a physical host site to send the data packet(s). The method begins in step 6000 and control proceeds to step 6100. In step 6100, the first header of the data packet(s) is stripped and a virtual host lookup operation is performed to determine the virtual host to which the data packet(s) is destined. This lookup operation provides a virtual host address to which the data packet(s) should be routed. Control then proceeds to step 6200. In step 6200, a determination is made whether the received data packet(s) belongs to an existing "recognized" flow, i.e., a data packet flow previously routed through this site-specific SLR cluster to one of the host servers at the physical host site. If so, control proceeds to step 6300, in which the data packet(s) is transmitted along a transmission path associated with the recognized flow to a previously selected host server. Control then proceeds to step 6700, in which the method ends until a new data packet is received at the site-specific SLR cluster.

If step 6200 determines that the packet(s) belongs to a connectionless service such as User Datagram Protocol (UDP), or is one of the first packets of a newly detected flow for which there is no "pinned-down" path yet, control proceeds to step 6400 in which a flow label is assigned to the data packet(s). Control then proceeds to step 6500 in which a host server is selected from among a number of host servers at the physical host site to which the site-specific SLR cluster corresponds. This selection determination is made based on a routing policy based on a cost or proximity metric or any arbitrary policy. Control then proceeds to step 6600 in which the packet(s) is tunneled to a host server by prepending a new, first IP header to the packet. Control then proceeds to step 6700, in which the method ends until a new data packet is received at the site-specific SLR cluster.

Figure 7:
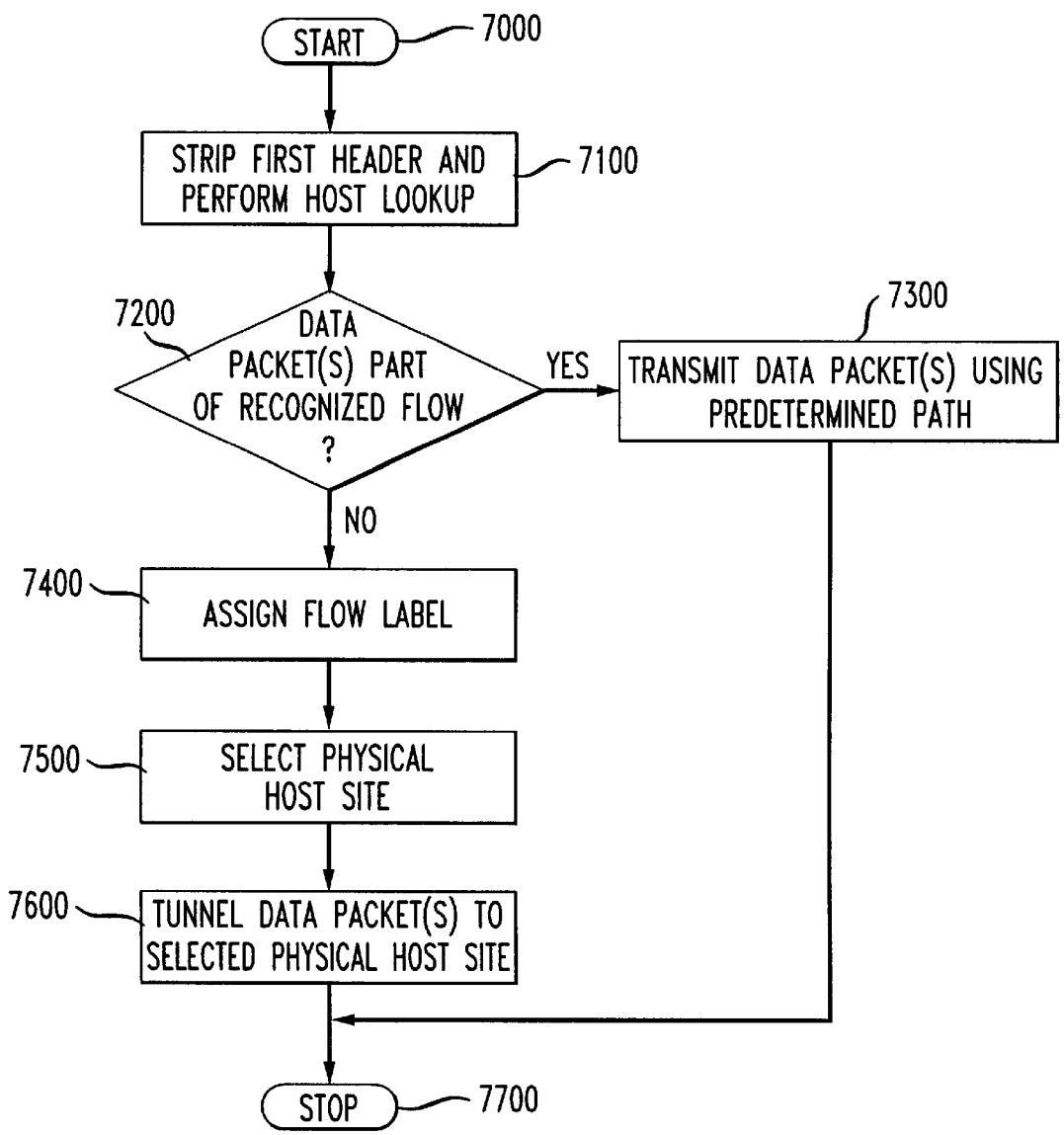
FIG. 7 is a flow chart illustrating a method for routing network service requests in accordance with the second exemplary embodiment of the invention.

FIG. 7 illustrates a method for routing a data packet(s) containing, e.g., a network service request received at a system-specific SLR cluster from a network service client or client' customer and destined for a virtual host providing that network service. The method determines through an SLR routing policy to which physical host site of a set of physical host sites supporting the virtual host to send the data packet(s). The method begins in step 7000 and control proceeds to step 7100. In step 7100, the first header of the data packet(s) is stripped and a virtual host lookup operation is performed to determine the virtual host to which the data packet(s) is destined. This lookup operation provides a virtual host address to which the data packet(s) should be routed. Control then proceeds to step 7200. In step 7200, a determination is made whether the received data packet(s) belongs to an existing "recognized" flow, i.e., a data packet flow previously routed through this system-specific SLR cluster to a host server at a physical host site within the AS. If so, control proceeds to step 7300, in which the data packet(s) is transmitted along a transmission path associated with the recognized flow to a previously selected host server. This transmission path may or may not bypass site-specific SLR clusters. Control then proceeds to step 7700, in which the method ends until a new data packet is received at the system-specific SLR cluster.

If step 7200 determines that the packet(s) belongs to a connectionless service such as UDP, or is one of the first packets of a newly detected flow for which there is no "pinned-down" path yet, control proceeds to step 7400 in which a flow label is assigned to the data packet(s). Control then proceeds to step 7500 in which a site-specific SLR cluster is selected from among a number of site-specific SLR clusters within the AS to which the system-specific SLR cluster corresponds. This selection determination is made based on a routing policy based on a cost or proximity metric or any arbitrary policy. Control then proceeds to step 7600 in which the packet(s) is tunneled to a host server by prepending a new, first IP header to the packet. Control then proceeds to step 7700, in which the method ends until a new data packet is received at the system-specific SLR cluster.

Figure 8:
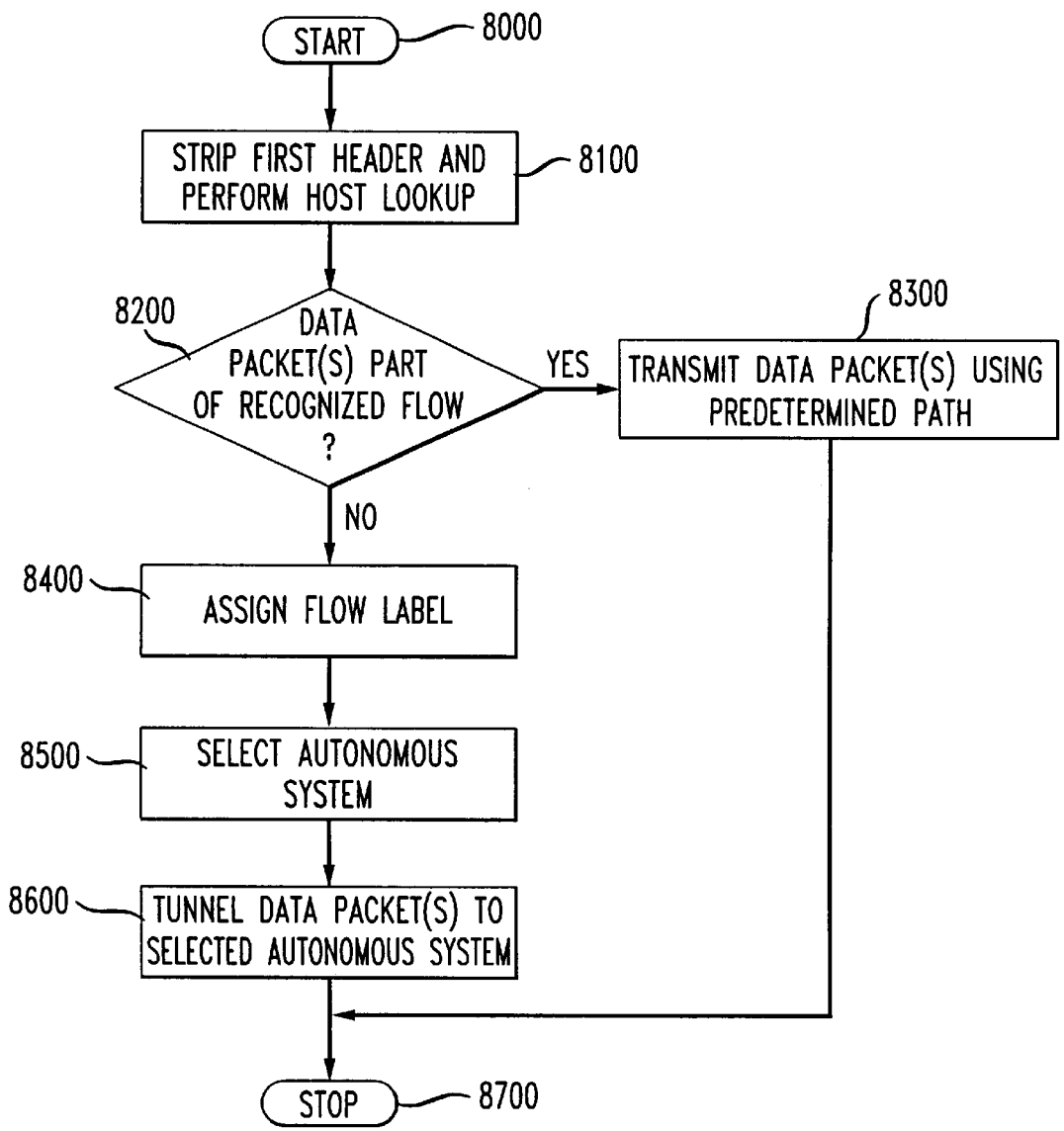
FIG. 8 is a flow chart illustrating a method for routing network service requests in accordance with the third exemplary embodiment of the invention.

FIG. 8 illustrates a method for routing a data packet(s) containing, e.g., a network service request received at a network-level SLR cluster from a network service client or client' customer and destined for a virtual host providing that network service. The method determines through an SLR routing policy to which AS of a set of ASs supporting the virtual host to send the data packet(s). The method begins in step 8000 and control proceeds to step 8100. In step 8100, the first header of the data packet(s) is stripped and a virtual host lookup operation is performed to determine the virtual host to which the data packet(s) is destined. This lookup operation provides a virtual host address to which the data packet(s) should be routed. Control then proceeds to step 8200. In step 8200, a determination is made whether the received data packet(s) belongs to an existing "recognized" flow, i.e., a data packet flow previously routed through this network-level SLR cluster to a host server at a physical host site within an AS in this network. If so, control proceeds to step 8300, in which the data packet(s) is transmitted along a transmission path associated with the recognized flow to a previously selected host server. This transmission path may or may not bypass site-specific SLR clusters. Control then proceeds to step 8700, in which the method ends until a new data packet is received at the system-specific SLR cluster.

If step 8200 determines that the packet(s) belongs to a connectionless service such as UDP, or is one of the first packets of a newly detected flow for which there is no "pinned-down" path yet, control proceeds to step 8400 in which a flow label is assigned to the data packet(s). Control then proceeds to step 8500 in which a system-specific SLR cluster is selected from among a number of system-specific SLR clusters, each acting as gateways for ASs within the network to which the network-level SLR cluster corresponds. This selection determination is made based on a routing policy based on a cost or proximity metric or any arbitrary policy. Control then proceeds to step 8600 in which the packet(s) is tunneled to a host server by prepending a new, first IP header to the packet. Control then proceeds to step 8700, in which the method ends until a new data packet is received at the network-level SLR cluster.

As mentioned above, tunneling may be performed using arbitrary policies for tunneling connections to host servers. Description of particular policies are best defined within the mechanism's application context. However, an overview of the mechanisms and methodology that distribute state between the SLRs in order to realize the policy will now be explained.

Service level routing may be hierarchical. At a first level, e.g., a gateway to an AS, a connection may be routed to a next level gateway, e.g., a gateway to a physical host site, based on a load, cost, or proximity metric or some other arbitrary criteria. The gateway at that level can represent the last level of routing through an SLR network, i.e., is the last gateway before a server farm, or an intermediate level, i.e., an access gateway to an SLR subnetwork. Every gateway may maintain a table of all gateways that belong to the next level. Such a table is relatively stable and can be defined statically by an SLR network operator or administrator. However, to simplify management, it may be preferable to have each SLR retrieve this table automatically from a network configuration site.

In order to select the appropriate next level gateway, the cost metric may be calculated as a function of routing distance, availability, load information, or any other relevant information. For example, the cost metric may be based on the routing distance between a client or client' customer and a next level gateway, i.e., location of a next SLR cluster. This distance can be in turn computed by combining routing protocol information, e.g., the Border Gateway Protocol (BGP) distance between the client and the first level gateway, the internal routing protocol, e.g., Open Shortest Path First (OSPF), distance between the current and the next level SLR, etc. Alternatively, or in addition, the cost metric may be based on the availability of networking resources to a next level gateway, server loading information (e.g., when the next level SLR is a server farm access gateway, or any other user-specified policy for the particular virtual host (e.g., time-of-day routing, etc.)

The determination of which next level gateway to tunnel to is made using information currently available at the SLR. SLRs may obtain information about network conditions by listening to routing updates and potentially through limited use of active probing. Therefore, it is preferable that service level load information is propagated between SLRs.

It is foreseeable that it may be preferable to combine network and service metrics. However, such policies are likely to be application specific. Nevertheless such a combination is preferably implemented using a mechanism for state exchange between the SLRs.

Every data packet received by an SLR triggers a lookup action that determines if the packet belongs to an existing data flow, or if it is part of a new one. In the latter case, the SLR decides to which SLR at a next level of abstraction to tunnel the packet. This decision is made using a combination of routing and loading information that is collected from the SLRs at the next level, or at an SLR at a last level of abstraction, e.g., physical host sites.

Every physical host site is configured with the identity of the SLR(s) in the immediately higher level. Initially, the physical host site registers itself with that SLR using a simple "hello" protocol, which includes a certificate sent by the physical host site for authentication purposes. The certificate allows the SLR to verify that the new physical host site is a valid/trusted host site to which connections should be forwarded. At regular time intervals, the host site sends state information that includes a set of virtual host addresses (which can be subnetted), and loading information for every address to the SLRs that the host site knows. This scheme allows the capability of offering differentiated hosting service for sets of virtual addresses: for example, one subnet can be assigned to high priority customers and another to customers that can accept a best effort service (e.g., whatever processing load is left from the high priority class is given to them). For example, the host site may advertise the virtual subnet 192.200.*.* with load index of 0.30 and 192.201.*.* with a load index of 0.87. The load in this example is a scalar quantity, but in reality it can be anything.

Figure 9:
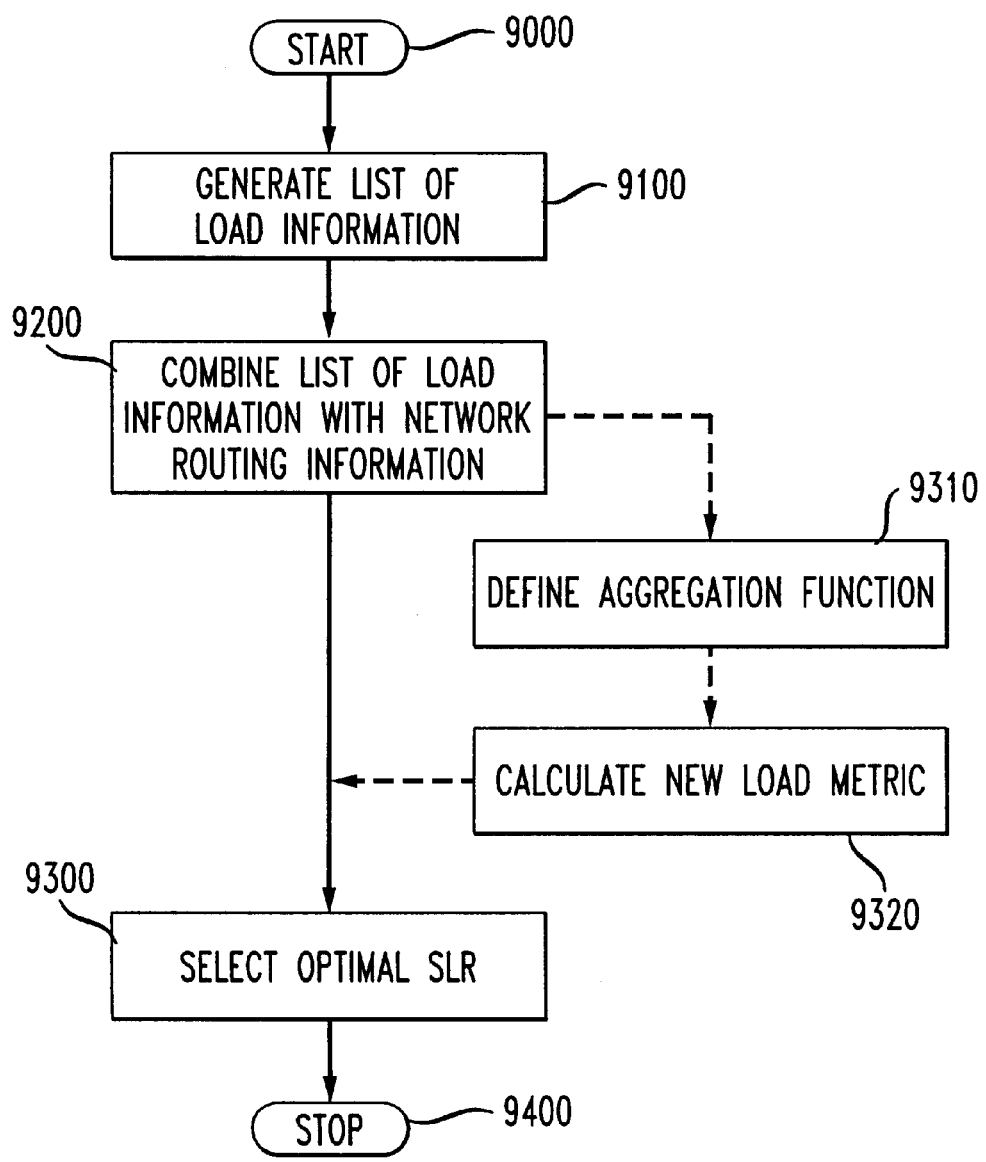
FIG. 9 is a flow chart illustrating a method of updating an SLR's local tunnel routing table in accordance with the exemplary embodiments of the invention.

It is preferable that every SLR collects state information from hosts or other SLRs at the next lower level. It is also preferable that, periodically, an SLR updates its local tunnel routing table, by aggregating the collected information. Such an update may be performed as shown in FIG. 9. A method for beginning the update begins in step 9000 and control proceeds to step 9100. In step 9100, a list is generated of loading information received from SLRs at the next lower level for every virtual subnet for which the SLR has information. Control then proceeds to step 9200. In step 9200, this information is combined with network routing information. Control then proceeds to step 9300, in which an optimal SLR (or host, depending on the level of the SLR performing the update) is selected for tunneling new connections for this virtual subnet. Control then proceeds to step 9400, in which the method ends.

In a more formal example of how the optimal SLR is selected in step 9300, assume that the SLR that will perform the method illustrated in FIG. 9 has received information for K virtual subnets from J SLRs. Let $s_{kj}$, where k=1, ..., K and j=1, ..., J, be the load information for subnet k received from $SLR_j$ (since not all SLRs support all subnets, some $s_{kj}$ are not defined). Additionally, let $r_j$ be the routing cost associated with $SLR_j$. Whenever a new connection for subnet $v_k$ is received, the SLR calculates a cost metric $m_{kj}=F(s_{kj},r_j)$ for every SLR at the immediately lower level that serves the virtual subnet. The function F is determined and installed by the network operator. The SLR performing the update then chooses the one with the lowest cost.

The method illustrated in FIG. 9, and the step for selecting the optimal SLR at the next lower level can be performed at periodic intervals, in which case the SLR builds a table that indicates which SLR at the next lower level has the least associated cost for each virtual subnet. Further, the SLR performing the update may also perform an aggregation of these metrics for every virtual subnet, that may then be sent through a state update packet to SLRs at a level above the level of the SLR performing the update if any exists. In such a situation additional steps 9310 and 9320, as shown in relationship to steps 9300 and 9400 by a dashed flow line, may be performed. In step 9310, in which the aggregation function $G(s_{k1}, \ldots s_{kj}, r_1, \ldots r_j)$ is defined by a network manager, which may or may not be automated, and can be tuned to more reflect the current routing situation or the loading metric received from the underlying SLRs. In step 9320, the new load metric is calculated as $M_k=G(s_{k1}, \ldots, s_{kj}, r_1, \ldots r_j)$ for every virtual subnet k. The interval at which computations and state updates illustrated in FIG. 9 is preferably configurable by the network manager.

Another aspect of exemplary embodiments provides improved architecture and methodology for handling state failure and recovery. In the architecture described above in connection with the exemplary embodiments, state is maintained at tunnel entry points for each data flow to direct the data packets of the flow into the appropriate tunnel. This state maintains consistency at the application (e.g., transport) level. Tunnel entry points can be an SLR, or a cooperating router. In general, the architecture supports multiple tunnel hops, each of which maintains per flow state. For example, a packet may be routed through at most two tunnels, the first from an access point of an AS to a selected physical host site, and the second within the physical host site to a selected server, as illustrated in connection with the second exemplary embodiment illustrated in FIG. 3.

Since the flow state corresponds to an application-level state at the client or client' customer terminal and at the host server, loss of this state will typically result in the loss of the corresponding application level connection. This violates the principle of sharing of fate, as both end-systems may survive while their connection dies. However, any customer transport redirection scheme shares this drawback.

This issue may be addressed either through local recovery at the tunnel entry or through recovery from the server. At tunnel entry, three types of failures can cause the loss of flow forwarding state. First, the tunnel entry router may lose its classification state or data flow starts to arrive at a different router still within the same SLR cluster. Second, the SLR may fail. Third, an external routing change may cause the flow from client to the AS to arrive at a different SLR cluster. By assumption, a physical host site has only one SLR cluster so the third type only applies to a network access point.

It is preferred that these three types of failures be treated as mutually exclusive. This is because multiple failures are both more difficult to recover from and less likely.

In the first type of failure cause, i.e., when the tunnel entry router looses its classification state or data flow starts to arrive at a different router still within the same SLR cluster, since unclassified packets destined for the virtual host are routed to the SLR, the SLR simply recreates the state in the router currently receiving the flow. The only impact of this recovery mechanism is a temporary degradation in performance. However, the state is restored and the application connection is unaffected.

In the second type of failure cause, i.e., an SLR failure, a hot spare SLR is included in the SLR cluster. The hot spare SLR mirrors the state of the main SLR (possibly with some latency), and immediately takes over when the main SLR fails. If the state of the main SLR is propagated to the hot spare SLR more slowly, thus resulting in time-delayed information, very recent data flow connections will fail, whereas longer lived data flow connections survive.

The third type of failure cause, i.e., an external routing change causes the flow from client to the AS to arrive at a different SLR cluster, is the most difficult to address at the tunnel entry point. This is because the new SLR cluster may be physically far away and may see a very different network topology and network conditions. Without non-local information, it is unlikely that the new SLR cluster will find the host server currently serving the data flow connection. It should be appreciated that locating the host server is essential as that server has the connection state, in particular the information about which objects are being accessed.

One possible solution is to replicate the mapping tables between all SLRs at the same level. Replication, however, is a very expensive option, in particular, if data flow connection failures are infrequent. One alternative that is similar to cellular networking may use an SLR cluster that receives a packet of an ongoing flow and broadcasts a limited scope "WHOHAS" query to neighboring SLR clusters to retrieve the state of that connection. Once the missing state has been found, the connection can be tunneled to the original server, maintaining the correctness of the upper layer protocols of that connection.

Figure 10:
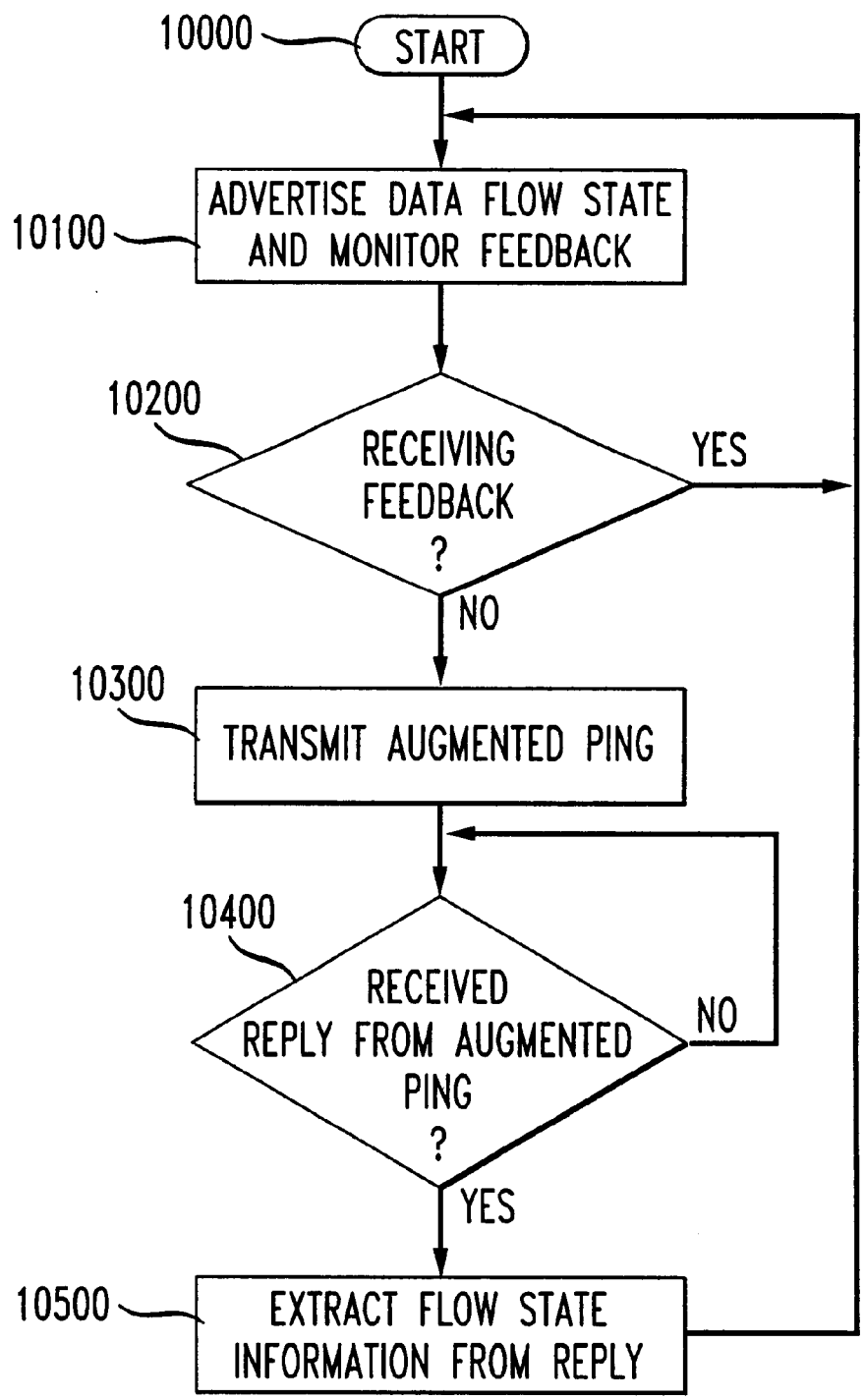
FIG. 10 is a flow chart illustrating a method whereby the flow state should share its fate with the end-points of the connection in accordance with the exemplary embodiments of the invention.

Most preferably, the flow state should share its fate with the end-point of the connection. This can be achieved using the method steps illustrated in FIG. 10. Lack of progress may be used to suggest loss of network state because the server maintains essential state and monitors progress of the flow. The method begins in step 10000 and control proceeds to step 10100. In step 10100, in an attempt to recover the network state, the selected host server advertises the data flow state using an augmented PING from the selected host server to the client or client' customer terminal and monitors data flow for feedback. Control then proceeds to step 10200, in which it is determined whether the selected host server has stopped receiving feedback from the client or client' customer terminal (e.g., ACKs) for some period of time (e.g., larger than transport level error recovery but still smaller than connection timeout). If not, control returns to step 10100 for monitoring data flow.

If so, control proceeds to step 10300, in which the selected host server sends an augmented ping (e.g., ICMP ECHO REQUEST) message to the client or client' customer terminal, using the virtual domain address of the previously received data flow. The first 64 bytes of the ping are as required by ICMP. However in addition the server appends to the message a type identifier, identifying the payload to be an SLR flow advertisement, followed by the flow classifier and the server identification, i.e., the source address, source port, the virtual domain destination address and port, and then the server address and server port. Control then proceeds to step 10400, in which the selected host server monitors received data for a reply from the client or client' customer terminal. If the client or client' customer terminal is ICMP compliant, it will reply to the ping, with an echo response, including all of the payload sent in the ping message. If the client or client' customer terminal responds to the PING, the reply follows the same path towards the virtual host as other data packets, and thus arrives at the SLR currently receiving the flow. If a reply is not received, control maintains at step 10400. If a reply is received, control proceeds to step 10500, in which the SLR extracts the flow state from the appended payload when receiving an echo reply destined for the SLR. Control then returns to step 10100 for further monitoring.

This approach allows the state to be recovered as long as the two end-points are reachable. Determining the appropriate timer values for various transport protocols may be both application and network specific.

Perhaps the most significant application of service level routing is the transparent hosting of web services. A large ISP may operate a large SLR backbone and a number of server farms at multiple locations of that backbone. Clients wishing to host their web services using SLR functionality can either share the server resources provided by the ISP or use the SLR functionality to direct incoming connections to their own server sites. The latter requires that the client has an SLR gateway at each site and exchanges SLR state information with the backbone.

The policy for routing connections to individual servers can be entirely defined by the client. Incoming connections can be routed based on the location of the client, and the loading at each server farm.

Another import class of applications that can take advantage of the SLR architecture is supporting client's media streaming services such as high quality audio servers (e.g., a2bmusic.com), news (e.g., pointcast.com), radio (e.g., netcast.com), etc. Media streaming often requires large amounts of bandwidth in the reverse direction, i.e., from the server supporting the client's service to the client's customer, hence the policy for routing connections to media servers can ensure that connections are routed to the server with the best reverse path to the client or client' customer terminal.

Although the inventors have implemented exemplary embodiments of the invention on the Programmable Networks of Tomorrow (PRONTO) router, it is foreseeable that the exemplary embodiments of the invention are implemented on other capable, commercially-available routers and associated equipment as well. The PRONTO router is a dynamically programmable active router within a Linux kernel that supports programmability at different timescales of activity, ranging from control plane programmability to programming the forwarding behavior of every packet. As such, the PRONTO router provides a unique platform to prototype and experiment with various policies for service level routing. However, the salient features of the PRONTO router exploited by the exemplary embodiments of the invention include but are not limited to advanced packet classification and QoS capabilities, enhanced signaling capabilities, and dynamic tunneling. To support programmability, these facilities have well defined Application Program Interfaces (APIs), through which a service specific program can manipulate and control the service generic facilities. In addition, to ease or programming, this strong separation makes the PRONTO router a superior model for practical realization.

Figure 11:
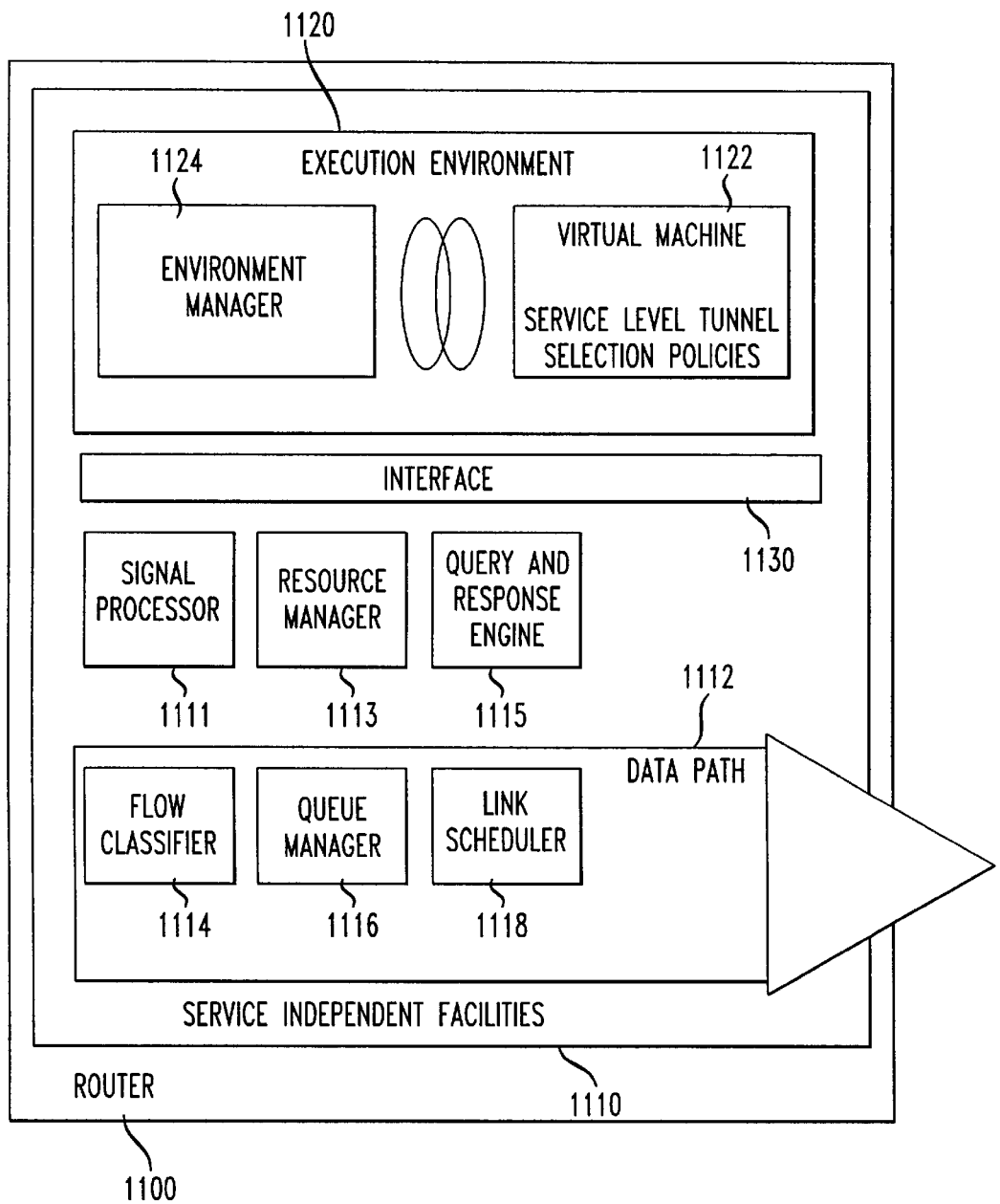
FIG. 11 is one example of a realization of an SLR cluster in accordance with the exemplary embodiments of the invention.

As illustrated in FIG. 11, the PRONTO router architecture 1100 has three major parts: service independent facilities 1110 for resource management and networking, an execution environment 1120 where service specific functions reside and execute, and the interface 1130 between the two as illustrated in FIG. 11. The most significant part of the architecture is the separation of the service generic facilities of the forwarding engine from the service specific functions running in an execution environment. Whereas the architectural separation is strong, the interface 1130 represents an abstraction boundary, and does not necessarily reflect an implementation choice. The PRONTO router may be have multiple execution environments running, for example, depending on trust assumptions and performance requirements.

An execution environment 1120 consists of a virtual machine 1122 and an environment manager 1124. The environment manager 1124 is responsible for authenticating, installing and managing the programs executing in its environment. In addition, the environment manager 1124 dispatches messages, e.g., control/signaling messages, to programs in its environment. Each environment manager has access to an HTTP proxy, and a certificate authority proxy. Typically both are run on the router 1100.

Below the abstraction interface, in the service independent facilities 1110, is a networking engine and other service generic OS and hardware facilities. The data-path 1112 is that of a router. Indeed a realization of the PRONTO architecture could be a combination of a high performance router and a workstation. The three major components in the data-path 1112 are a flow classifier 1114, a queue manager 1116 and a link scheduler 1118. These facilities currently exist in all routers, although typically less capable than on the PRONTO router, with conventional routers classifying only on destination prefix, and using a single First In First Out (FIFO) queue. More recent higher end routers support richer classification, ability to configure multiple queues and simple scheduling among these queues. The PRONTO proxy pushes the envelope on each of these components in terms of functionality, flexibility and programmability. In particular data-path 1112 can support fine-grained QoS, both per flow, but also at more aggregate level.

Off the data path 1112 there is a service generic signaling processor 1111, a resource manager 1113, and a Query and Response Engine (QRE) 1115. The service generic signaling processor 1111 enhances and generalizes current IP signaling to support tunnel and connectivity management, and to allow user-defined service specific signaling. In the SLR we use the latter to implement the SLR level signaling. The resource manager 1113 schedules resource use, CPU, I/O etc., and supports resource isolation between multiple policies.

As tunneling is the basic concept used to perform service level routing, the inventors have enhanced the tunneling capabilities of the PRONTO Linux router. This implementation provides three benefits. First, performance degradation due to entering and exiting traditional IP-in-IP tunnels is minimized. Minimizing performance degradation due to entering and exiting traditional IP-in-IP tunnels is important, although the emphasis and solution is different for high performance routers, for the SLR and the host server. Second, the separation between the abstraction of a tunnel and the traditional implementation using IP-in-IP encapsulation is enhanced. Separating the abstraction of a tunnel and the conventional implementation using IP-in-IP encapsulation allows encapsulation of the tunneling abstraction from the IP layer. As a result, the details of the tunnel implementation may be hidden from client or client' customer machines, in particular, whether the tunnel is implemented using IP-in-IP encapsulation or, instead, using connection oriented facilities, such as ATM, MPLS or WDM directly. Third, tunnel creation, to more easily and efficiently support dynamic tunnel creation is enhanced and simplified. This is simply an enhancement and polishing of existing mechanisms.

The exemplary embodiments described herein provide a general and efficient architecture and methodology for routing network service connections to a virtual host, supported by one or more physical hosts each including host servers, over a public network such as the Internet. Although the description of the exemplary embodiment focuses on their suitability for supporting web and streaming traffic in particular, it should be appreciated that the exemplary embodiments are applicable in a large class of client-server applications requiring connection-orientation communication.

In conventional DNS-based schemes, packets flowing in the reverse direction cannot be easily aggregated for scheduling purposes, something that is straightforward for the exemplary embodiments of the invention, in which packets in a return path contain the virtual host as their source address.

Any comparison of the exemplary embodiments of the invention and web caching mechanisms shows interesting results: Web caching requires the termination of the connection at intermediate points in the network. Since cache hit rates today are of the order of 30% (See, Ramon Caceres, Fred Douglis, Anja Feldmann, Michael Rabinovich, "Web Proxy Caching: The Devil is in the Details," Proceedings of the Workshop on Internet Server Performance, Madison, Wis., Jun. 23, 1998, hereby incorporated by references in its entirety) the client and its customers often encounter additional delay to connect to the server. The exemplary embodiments help ensure that the connection is terminated only once at a selected server that can fulfill the network service connection request, and further, that the connection is routed to that server in an optimal way.

Although efforts are now underway to evolve DNS into incorporating service-level functionality, it should be appreciated the best solution is to standardize a format for service names and an architecture similar to DNS that resolves service names to the address of a host server. The latter need not necessarily a network/transport layer address combination but may incorporate additional information that can be passed as a parameter to the selected host server.

While this invention has been described in conjunction with the specific embodiments outlines above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of the invention.

For example, although not explained in more detail above, any number of levels of indirection are possible during service request routing to reduce the need for distributing detailed state information about every host server in the entire network. Redirection across a multi-level hierarchy allows a more scalable network service level architecture and the isolation of policy between levels.

The network-level router may by located at an arbitrary point in a publicly accessible network or may be located at a gateway to a TD, as illustrated in FIG. 1, including a plurality of ASs.

Additionally, it should be appreciated that the term SLR cluster is meant to refer to at least one router performing service level routing.

Further, although FIG. 5 corresponds most clearly to the second exemplary embodiment of the network service load management and reliability system described in FIG. 3, it should be appreciated that similar principles of operation apply to any of the other exemplary embodiments of that system.

What is claimed is:

1. A system for state failure and recovery, the system comprising:
    at least one first router that performs routing of data packets based on an address associated with the data packets and a first routing policy for routing data packets based on a service associated with the data packets;
    a plurality of host servers providing the service associated with the data packets; and
    a plurality of tunnels coupling the at least one first router and the plurality of host servers, respectively,
    wherein, a flow state corresponding to an application-level state at a terminal originating the data packets is maintained at the at least one first router for each data flow of data packets to direct the data flow of data packets into a selected tunnel from among the plurality of tunnels to a selected host server from among the plurality of host servers so as to maintain consistency at the application level such that packets destined for the originating terminal from the host server do not have to travel through the at least one first router.

2. The system of claim 1, wherein the flow state also corresponds to an application level state at the selected server.

3. The system of claim 1, wherein the flow state is maintained by the at least one first router recreating the flow state in an alternative first router.

4. The system of claim 1, wherein the flow state is maintained by the at least one first router switching the routing of the data packets to an alternative first router that includes identical routing policy information relating to how data packets are routed as is included in the at least one first router.

5. The system of claim 1, wherein the flow state is maintained by including routing policy information relating to how data packets are routed at a plurality of first routers that are coupled to a terminal originating the data packets and, if data packets are sent to an alternative first router of the plurality of first routers, the alternative first router routes the data packets to the at least one first router that routes the data packets to the selected host server.

6. A method for state failure and recovery, the method comprising:
    receiving data packets at a first router from an originating terminal, the data packets including information about a service associated with the data packets;
    selecting a host server to which the data packets are routed based on an address associated with the data packets and a first routing policy for routing data packets based on the service associated with the data packets;
    routing the received data packets from the first router to the selected host server via an associated tunnel; and
    maintaining a flow state corresponding to an application-level state at the terminal originating the data packets at the first router for each data flow of data packets to direct the data flow of data packets into the tunnel associated with the host server so as to maintain consistency at the application level such that packets destined for the originating terminal from the host server do not have to travel through the at least one first router.

7. A network in which tunneling of data packets associated with a particular service is performed using arbitrary policies to route the data packets from an originating terminal generating at least a portion of the data packets to a host server providing the particular service, the network comprising:

at least one router that receives the data packets from the originating terminal through a first tunnel and routes the received data packets to a server providing the particular service through a second tunnel wherein packets destined for the originating terminal from the host server do not have to travel through the at least one router.

8. The network of claim 7, wherein the arbitrary policies are based on a load, cost or proximity metric.

* * * * *